(12) United States Patent
Takano

(10) Patent No.: US 10,225,857 B2
(45) Date of Patent: Mar. 5, 2019

(54) DEVICE AND METHOD

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 27 days.

(21) Appl. No.: 15/505,133

(22) PCT Filed: Jun. 22, 2015

(86) PCT No.: PCT/JP2015/067913
§ 371 (c)(1),
(2) Date: Feb. 20, 2017

(87) PCT Pub. No.: WO2016/031367
PCT Pub. Date: Mar. 3, 2016

(65) Prior Publication Data
US 2017/0257880 A1 Sep. 7, 2017

(30) Foreign Application Priority Data
Aug. 29, 2014 (JP) .................................. 2014-174905

(51) Int. Cl.
*H04W 72/12* (2009.01)
*H04W 16/14* (2009.01)
(Continued)

(52) U.S. Cl.
CPC ....... *H04W 72/1273* (2013.01); *H04L 1/1822* (2013.01); *H04L 1/1887* (2013.01); *H04L 1/1893* (2013.01); *H04L 1/1896* (2013.01); *H04W 16/14* (2013.01); *H04W 28/04* (2013.01); *H04W 72/04* (2013.01); *H04W 72/042* (2013.01); *H04W 72/0453* (2013.01); *H04W 74/0808* (2013.01); *H04W 88/06* (2013.01); *H04W 88/10* (2013.01)

(58) Field of Classification Search
CPC ............. H04W 72/1273; H04W 88/10; H04W 72/0453; H04W 74/0808; H04W 88/06; H04W 72/042
See application file for complete search history.

(56) References Cited

U.S. PATENT DOCUMENTS

2014/0211722 A1   7/2014  Pietraski et al.
2015/0327275 A1*  11/2015 Kwon .................. H04L 5/0055
                                              370/236

FOREIGN PATENT DOCUMENTS

EP    2384074 A1   11/2011
EP    3139531 A1    3/2017
(Continued)

OTHER PUBLICATIONS

Extended European Search Report of EP Application No. 15834941. 5, dated Mar. 27, 2018, 10 pages off EESR.

*Primary Examiner* — Thai Nguyen
(74) *Attorney, Agent, or Firm* — Chip Law Group

(57) ABSTRACT

Provided is a device, including: a control unit configured to control transmission of downlink data in a manner that the transmission of the downlink data is performed using a first frequency band shared by a plurality of wireless communication systems including a cellular system. The control unit controls retransmission of the downlink data in a manner that the retransmission of the downlink data is performed using a second frequency band for the cellular system.

16 Claims, 26 Drawing Sheets

(51) Int. Cl.
*H04W 28/04* (2009.01)
*H04W 72/04* (2009.01)
*H04W 74/08* (2009.01)
*H04W 88/06* (2009.01)
*H04W 88/10* (2009.01)
*H04L 1/18* (2006.01)

(56) References Cited

FOREIGN PATENT DOCUMENTS

| | | |
|---|---|---|
| JP | 2006-094001 A | 4/2006 |
| JP | 2006-094003 A | 4/2006 |

\* cited by examiner

DEVICE AND METHOD

CROSS REFERENCE TO RELATED APPLICATIONS

This application is a U.S. National Phase of International Patent Application No. PCT/JP2015/067913 filed on Jun. 22, 2015, which claims priority benefit of Japanese Patent Application No. JP 2014-174905 filed in the Japan Patent Office on Aug. 29, 2014. Each of the above-referenced applications is hereby incorporated herein by reference in its entirety.

TECHNICAL FIELD

The present disclosure relates to a device and a method.

BACKGROUND ART

In the $3^{rd}$ Generation Partnership Project (3GPP), various technologies for improving system throughput have been discussed. It may be said that a first shortcut for improving the system throughput is increasing a frequency to be used. In the 3GPP, the technology of carrier aggregation (CA) has been considered in Release 10 and Release 11. CA is a technology for improving the system throughput and a maximum data rate by aggregating component carriers (CCs) having a bandwidth of 20 MHz for use. A frequency band available as a CC must adopt the technology of such CA. Thus, a frequency band available for wireless communication of a cellular system is required.

For example, in Patent Literature 1, technology which enables a registered frequency band available for a registered provider and an unlicensed band available when a predetermined condition is satisfied to be used in addition to a dedicated frequency band allocated to each provider for exclusive use is disclosed.

CITATION LIST

Patent Literature

Patent Literature 1: JP 2006-094001A

DISCLOSURE OF INVENTION

Technical Problem

When a frequency band shared by a plurality of wireless communication systems (that is, a frequency band of an unlicensed band) is used in a cellular system, for example, a base station transmits downlink data using the frequency band. The base station can perform retransmission of the downlink data using the frequency band as well.

However, when the frequency band shared by a plurality of wireless communication systems is used, it may be difficult to perform retransmission of the downlink data. As an example, since the frequency band is also used in other wireless communication systems, the frequency band can be used in the cellular system at the time of transmission of downlink data, but it is not necessarily possible to use the frequency band in the cellular system at the time of retransmission of the downlink data. There may be cases in which long-term use of the frequency band is not permitted. As another example, since the frequency band (for example, a channel of a wireless LAN) is also used in other wireless communication system (for example, the wireless LAN), when a signal of the cellular system is transmitted using the frequency band, the signal may collide with signals of the other wireless communication systems. For this reason, the downlink data may not be appropriately transmitted and received.

In this regard, it is desirable to provide a mechanism which is capable of retransmitting downlink data with a high degree of certainty when a frequency band shared by a plurality of wireless communication systems is used in a cellular system.

Solution to Problem

According to the present disclosure, there is provided a device, including: a control unit configured to control transmission of downlink data in a manner that the transmission of the downlink data is performed using a first frequency band shared by a plurality of wireless communication systems including a cellular system. The control unit controls retransmission of the downlink data in a manner that the retransmission of the downlink data is performed using a second frequency band for the cellular system.

According to the present disclosure, there is provided a method, including: controlling, by a processor, transmission of downlink data in a manner that the transmission of the downlink data is performed using a first frequency band shared by a plurality of wireless communication systems including a cellular system; and controlling, by the processor, retransmission of the downlink data in a manner that the retransmission of the downlink data is performed using a second frequency band for the cellular system.

According to the present disclosure, there is provided a device, including: a control unit configured to perform a receiving side process in a retransmission control process according to transmission of downlink data performed by a base station using a first frequency band shared by a plurality of wireless communication systems including a cellular system. The control unit performs the receiving side process in the retransmission control process according to retransmission of the downlink data performed by the base station using a second frequency band for the cellular system.

According to the present disclosure, there is provided a method, including: performing, by a processor, a receiving side process in a retransmission control process according to transmission of downlink data performed by a base station using a first frequency band shared by a plurality of wireless communication systems including a cellular system; and performing, by the processor, the receiving side process in the retransmission control process according to retransmission of the downlink data performed by the base station using a second frequency band for the cellular system.

Advantageous Effects of Invention

As described above, according to the present disclosure, it is possible to retransmit downlink data with a high degree of certainty when a frequency band shared by a plurality of wireless communication systems is used in a cellular system. Note that the effects described above are not necessarily limited, and along with or instead of the effects, any effect that is desired to be introduced in the present specification or other effects that can be expected from the present specification may be exhibited.

MODE(S) FOR CARRYING OUT THE INVENTION

Figure 1:
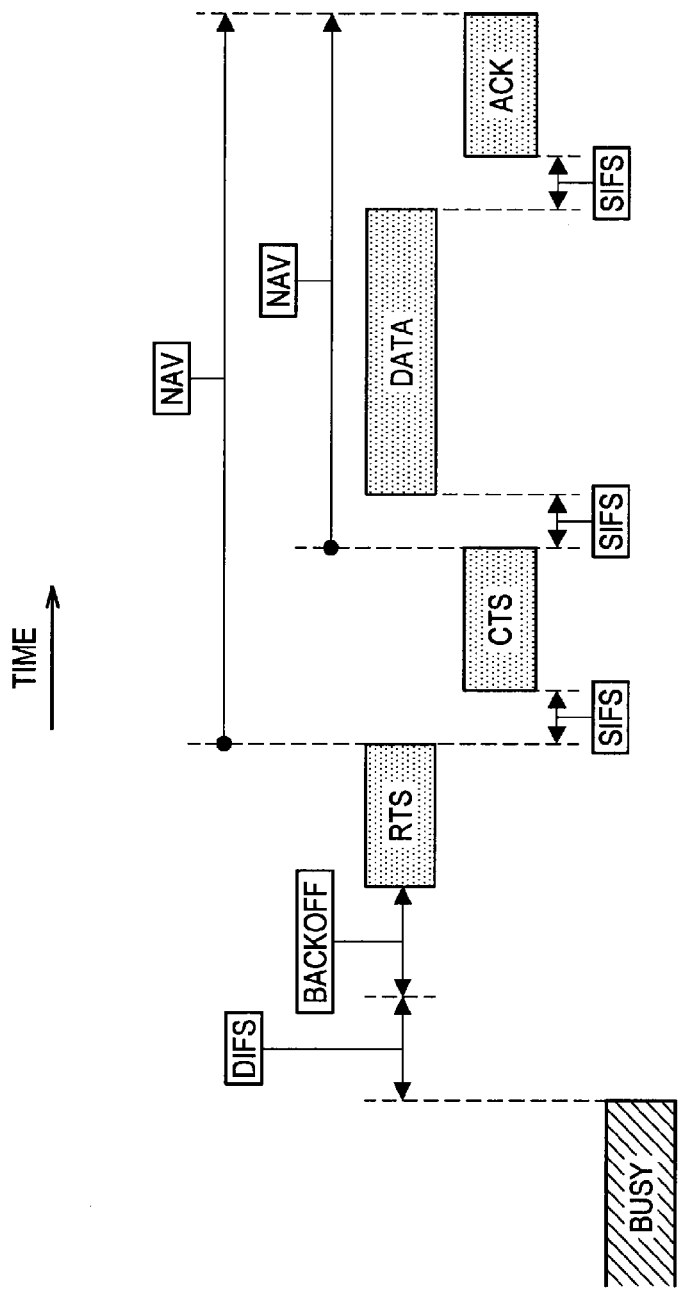
FIG. 1 is an explanatory diagram illustrating a frame format of Institute of Electrical and Electronics Engineers (IEEE) 802.11.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Also, the description will be given in the following order.
1. Introduction
2. Schematic configuration of system
3. Configuration of each device
　3.1. Configuration of base station
　3.2. Configuration of terminal device
4. Technical characteristics according to embodiment of present disclosure
　4.1. Technical characteristics regarding base station
　4.2. Technical characteristics regarding terminal device
5. Flow of process
6. Modified examples
7. Application examples
　7.1. Application examples regarding base station
　7.2. Application examples regarding terminal device
8. Conclusion <<1. Introduction>>

First, sharing of a frequency band, technology related to wireless communication, and technology related to a cellular system will be described with reference to FIGS. 1 to 5.

(Sharing of Frequency Band)

(a) Background of Frequency Sharing

A frequency band available for the cellular system is required. For example, a band of 5 GHz is considered as a frequency band for use in the cellular system.

However, the band of 5 GHz is also used in the wireless LAN. Thus, when the cellular system uses the band of 5 GHz, for example, the band of 5 GHz is shared between cellular system and wireless LAN. Specifically, for example, a frequency band of 5 GHz (for example, a channel of a wireless LAN) is used in the wireless LAN communication at a certain time and used in the cellular system at another time. Thereby, frequency utilization efficiency of the band of 5 GHz is improved. Also, the wireless LAN standard includes Institute of Electrical and Electronics Engineers (IEEE) 802.11a, 11b, 11g, 11n, 11ac, and 11ad, etc. and these standards are characterized in that IEEE 802.11 is adopted for a media access control (MAC) layer.

(b) Sharing Technique

Wireless LAN nodes (an access point and a station) are already widespread around the world. For this reason, from the point of view of backward compatibility, it is desirable for a mechanism for sharing a frequency band between a cellular system and a wireless LAN that does not change operations of the wireless LAN nodes to be reviewed as a technique of Long Term Evolution (LTE) and decided as a new standard of LTE. A terminal device conforming to the new standard is considered to use a frequency band shared between the cellular system and the wireless LAN (hereinafter referred to as a "shared band"), while a terminal device not conforming to the new standard is considered not to use the shared band.

(c) Usage as Component Carrier

In LTE, LTE-Advanced, or a cellular system conforming to a communication standard equivalent thereto, the shared band will be used as, for example, a component carrier (CC). Further, it is assumed that the frequency band of the cellular system is used as a primary component carrier (PCC) and the shared band is used as a secondary component carrier (SCC). Also, a control signal and a data signal can be transmitted and received using a frequency band of the cellular system and the data signal can be transmitted and received using the shared band.

(d) Fair Sharing

It is desirable for the shared band to be fairly shared between the cellular system and the wireless LAN. In the wireless LAN, since a channel (the shared band) is fairly shared according to carrier sense multiple access (CSMA), it is desirable for the channel (the shared band) to be fairly shared, for example, even between the cellular system and the wireless LAN through a technique in which CSMA is considered.

Various sharing techniques can be considered as fair sharing. For example, fair sharing can be defined as "the case in which opportunities for the wireless LAN to use the shared band and opportunities for the cellular system to use the shared band are equally given." In other words, it does not means that the cellular system and the wireless LAN are the same in actual communication traffic, and any case in which the same opportunities of communication are given to the cellular system and the wireless LAN is regarded as fair sharing.

As an example, when the shared band is used in the cellular system for a certain period, then the shared band is not used in the cellular system for the same period.

(Technology Related to Wireless LAN)

A frame format of IEEE 802.11 will be described as the technology related to wireless LAN with reference to FIG. 1. FIG. 1 is an explanatory diagram illustrating a frame format of IEEE 802.11.

In IEEE 802.11, a DATA frame and an acknowledgement (ACK) frame are basic frames. When the DATA frame is correctly received, the ACK frame is a frame which causes a transmitting side to know the success of reception of the DATA frame. Although wireless communication can be performed only by the DATA frame and the ACK frame in the wireless LAN, two frames such as a request to send (RTS) frame and a clear to send (CTS) frame are generally further used.

Before the RTS frame is transmitted, each wireless LAN node which performs the wireless LAN communication confirms that no signal is transmitted during a period referred to as a distributed coordination function (DCF) inter-frame space (DIFS). This is referred to as carrier sense. When nodes simultaneously start to transmit signals at a point in time at which the DIFS has elapsed, the signals may collide with each other. Thus, each node waits for a backoff time randomly set for each node and transmits a signal if no signal is transmitted for the backoff time.

Basically, the node cannot transmit the signal while any signal is detected. However, because there is a hidden terminal problem, an RTS frame and a CTS frame including a duration field for setting a value referred to as a network allocation vector (NAV) are added. The NAV is set on the basis of a value included in the duration field. The node setting the NAV avoids transmitting a signal during a period of the NAV.

First, a first node for transmitting the DATA frame transmits the RTS frame. Then, another node located around the first node receives the RTS frame and acquires a value included in the duration field in the RTS frame. The other node sets, for example, its own NAV to the above-mentioned acquired value and avoids transmitting a signal during the period of the NAV. For example, the period of the NAV is a period from the end of the RTS frame to the end of the ACK frame.

Also, a second node for receiving the DATA frame transmits the CTS frame after only a short inter-frame space (SIFS) from the end of the RTS frame according to the reception of the RTS frame. Then, another node located around the above-mentioned second node receives the CTS frame and acquires a value included in the duration field in the CTS frame. The other node sets, for example, its own NAV to the above-mentioned acquired value and avoids transmitting a signal during the period of the NAV. The period of the NAV is a period from the end of the CTS frame to the end of the ACK frame. Thereby, for example, it is possible to prevent the other node (that is, a hidden node for the above-mentioned first node) close to the above-mentioned second node without being close to the above-mentioned first node from transmitting a signal during communication of the above-mentioned first node and the above-mentioned second node.

Also, the RTS frame includes a frame control field, a reception address field, a transmission address field, and a frame check sequence (FCS) in addition to the duration field. Also, the CTS frame includes a frame control field, a reception address field, and an FCS in addition to the duration field.

Also, the DIFS and the SIFS in the standard of the IEEE 802.11 series have, for example, the following lengths.

TABLE 1

|      | 802.11b | 802.11g | 802.11a | 802.11n | 802.11ac |
|------|---------|---------|---------|---------|----------|
| SIFS | 10 us   | 10 us   | 16 us   | 16 us   | 16 us    |
| DIFS | 50 us   | 28 us   | 34 us   | 34 us   | 34 us    |

(Technology Related to Cellular System)

(a) Frame Format

Figure 2:
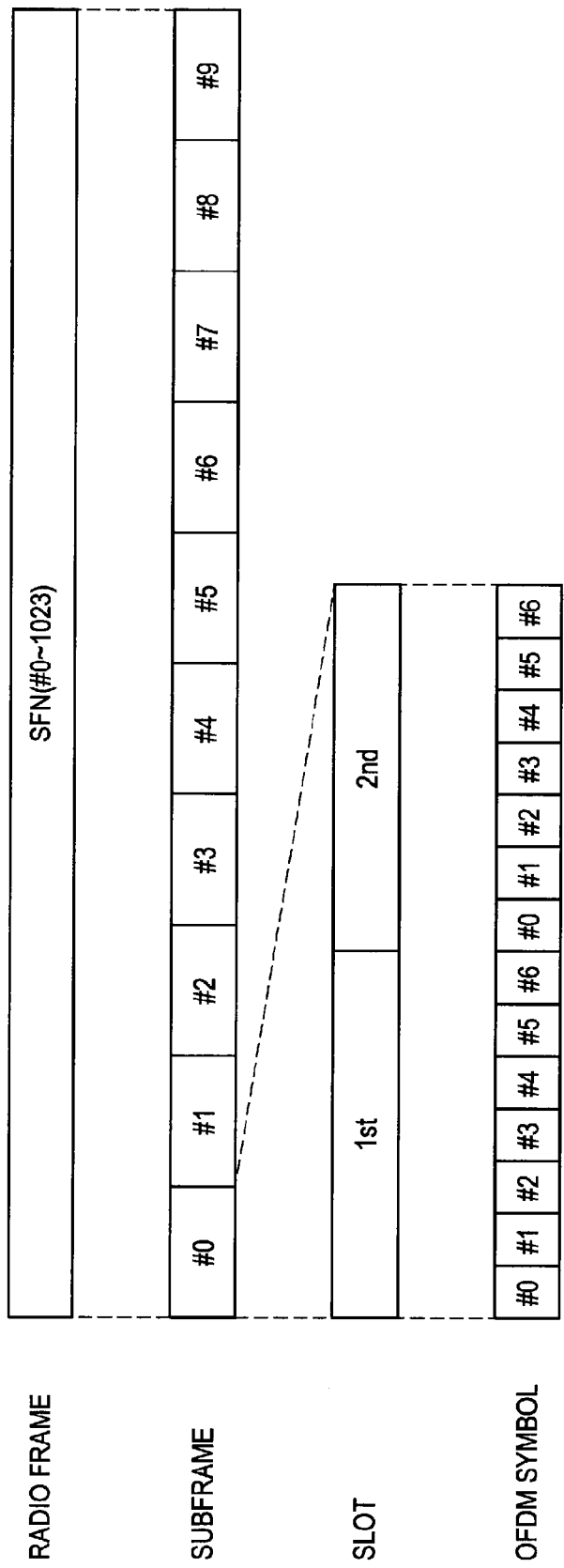
FIG. 2 is an explanatory diagram illustrating a frame format of long-term evolution (LTE).

The frame format of LTE will be described with reference to FIG. 2. FIG. 2 is an explanatory diagram illustrating the frame format of LTE.

First, a unit of time such as a radio frame is used in LTE. One radio frame is 10 ms. Each radio frame is identified by a system frame number (SFN) which is any one of 0 to 1023.

The radio frame includes 10 sub-frames identified by #0 to #9. Each sub-frame is 1 ms. Further, each sub-frame includes two slots and each slot includes, for example, seven orthogonal frequency division multiplexing (OFDM) symbols. That is, each sub-frame includes 14 OFDM symbols. Also, the frame format illustrated in FIG. 2 is a frame format of a downlink and the frame format of an uplink includes a single carrier frequency division multiple access (SC-FDMA) symbol in place of an OFDM symbol.

(b) Carrier Aggregation

Component Carriers

With carrier aggregation in Release 10, up to a maximum of five CCs are aggregated for use by user equipment (UE). Each CC is a band with a maximum width of 20 MHz. Carrier aggregation includes a case in which successive CCs in the frequency direction are used, and a case in which separated CCs in the frequency direction are used. With carrier aggregation, the CCs to be used may be set for each UE.

PCC and SCC

In carrier aggregation, one of the multiple CCs used by a UE is a special CC. This special CC is called the primary component carrier (PCC). Also, the remaining CCs among the multiple CCs are called secondary component carriers (SCCs). The PCC may be different depending on the UE.

Since the PCC is the most important CC among the multiple CCs, it is desirable for the PCC to be the CC with the most stable communication quality. Note that in actual practice, which CC to treat as the PCC depends on the implementation.

The SCC is added to the PCC. In addition, an existing SCC that has been added may also be removed. Note that changing an SCC is conducted by removing an existing SCC and adding a new SCC.

PCC Determination Method and Changing Method

When a UE connection is initially established and the status of the UE goes from Radio Resource Control (RRC) Idle to RRC Connected, the CC that the UE used during the establishment of the connection becomes the PCC for that UE. More specifically, a connection is established through a connection establishment procedure. At this point, the status of the UE goes from RRC Idle to RRC Connected. Also, the CC used in the procedure becomes the PCC for the above UE. Note that the above procedure is a procedure initiated from the UE side.

Additionally, PCC changing is conducted by a handover between frequencies. More specifically, if a handover is specified in a connection reconfiguration procedure, a PCC handover is conducted, and the PCC is changed. Note that the above procedure is a procedure initiated from the network side.

Adding SCC

As discussed above, the SCC is added to the PCC. As a result, the SCC is associated with the PCC. In other words, the SCC is subordinate to the PCC. SSC addition may be conducted through a connection reconfiguration procedure. Note that this procedure is a procedure initiated from the network side.

Removing SSC

As discussed above, an SCC may be removed. SSC removal may be conducted through a connection reconfiguration procedure. Specifically, a specific SCC specified in a message is removed. Note that the above procedure is a procedure initiated from the network side.

In addition, the removal of all SCCs may be conducted through a connection re-establishment procedure.

Special Role of PCC

The connection establishment procedure, the transmitting and receiving of non-access stratum (NAS) signaling, and the transmitting and receiving of uplink control signals on the physical uplink control channel (PUCCH) are conducted only by the PCC, and not by the SCCs.

In addition, the detection of a radio link failure (RLF) and a subsequent connection re-establishment procedure are also conducted only by the PCC, and not by the SCCs.

(Conditions of Backhauling for Carrier Aggregation)

For example, an ACK of a downlink signal on an SCC is transmitted by the PUCCH of the PCC. Since the ACK is used for the retransmission of data by the evolved Node B (eNB), a delay of the ACK is not acceptable. Consequently, when a first eNB using a CC that acts as the PCC for a UE is different from a second eNB using a CC that acts as an SCC for the UE, a backhaul delay of approximately 10 ms between the first eNB and the second eNB is desirable.

(c) HARQ

In LTE, a hybrid automatic repeat request (HARQ) is used as a retransmission control mechanism.

HARQ Process

For example, an eNB transmits data, and a UE receives the data. When an error is detected through a cyclic redundancy check (CRC) or the like, the UE transmits a negative acknowledgement (NACK) through an uplink. Upon receiving the NACK, the eNB retransmits the data, and the UE receives the data. When no error is detected through the CRC or the like (that is, when downlink data is properly received), the UE transmits an acknowledgement (ACK) through an uplink. Upon receiving the ACK, the eNB transmits new data. Such a data transmission/reception process is called a stop and wait (SAW) process. Particularly, in the case of the HARQ, the SAW process is also called a HARQ process. In one HARQ process, new data is not transmitted until the UE properly receives data. Further, for one UE, a plurality of HARQ processes are simultaneously performed.

A timing at which an ACK/NACK is transmitted for downlink data is not defined in the standard of LTE, and thus there is flexibility. However, when retransmission is delayed, data is delayed, and thus it is desirable to transmit an ACK/NACK as quickly as possible.

Case of Carrier Aggregation

In the case of the carrier aggregation, there is a HARQ entity for each component carrier (CC). The HARQ entity handles a plurality of HARQ processes for a corresponding CC.

An ACK/NACK is transmitted through a physical uplink control channel (PUCCH). In the case of carrier aggregation, the UE is able to transmit an ACK/NACK through the PUCCH of the primary component carrier (PCC) but unable to transmit an ACK/NACK through the PUCCH of the secondary component carrier (SCC). For this reason, an ACK/NACK for downlink data transmitted using the SCC is transmitted through the PUCCH of the PCC. Further, retransmission of the downlink data transmitted using the SCC is performed using the SCC. Understandably, retransmission of the downlink data transmitted using the PCC is performed using the PCC. This point will be described below with reference to FIG. 3 using a specific example.

Figure 3:
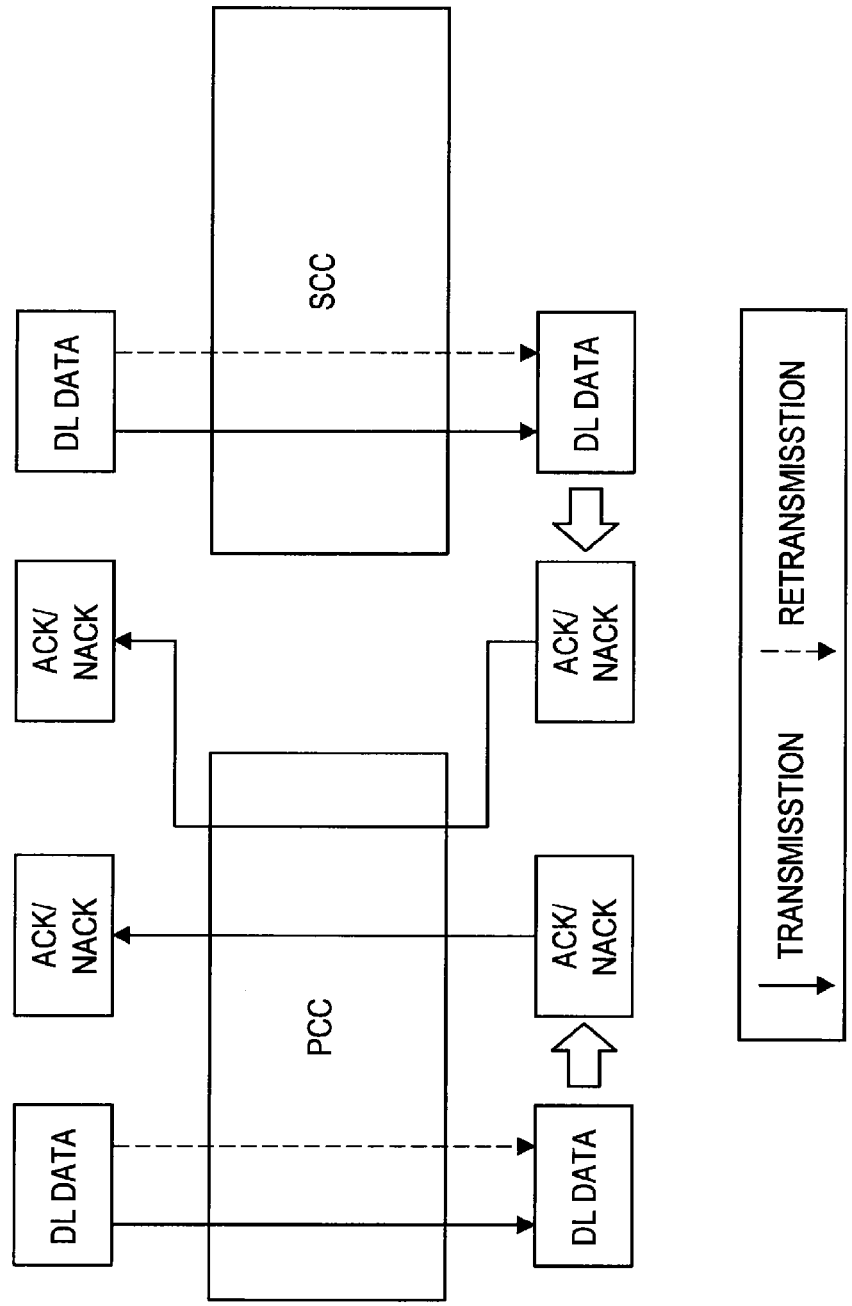
FIG. 3 is an explanatory diagram for describing an example of retransmission control in the case of carrier aggregation.

FIG. 3 is an explanatory diagram for describing an example of retransmission control in the case of carrier aggregation. Referring to FIG. 3, the PCC and the SCC are illustrated. The eNB performs transmission of downlink data using the PCC, and the UE transmits an ACK/NACK for the downlink data using the PCC. When the ACK for the downlink data is not received, the eNB performs retransmission of the downlink data using the PCC. Further, the eNB performs transmission of downlink data using the SCC, and the UE transmits the ACK/NACK for the downlink data using the PCC rather than the SCC. When the ACK for the downlink data is not received, the eNB performs retransmission of the downlink data using the SCC.

In the future, dual connectivity may be introduced. In this case, the UE can transmit an ACK/NACK using both of the two CCs. This point will be described below with reference to FIG. 4 using a specific example.

Figure 4:
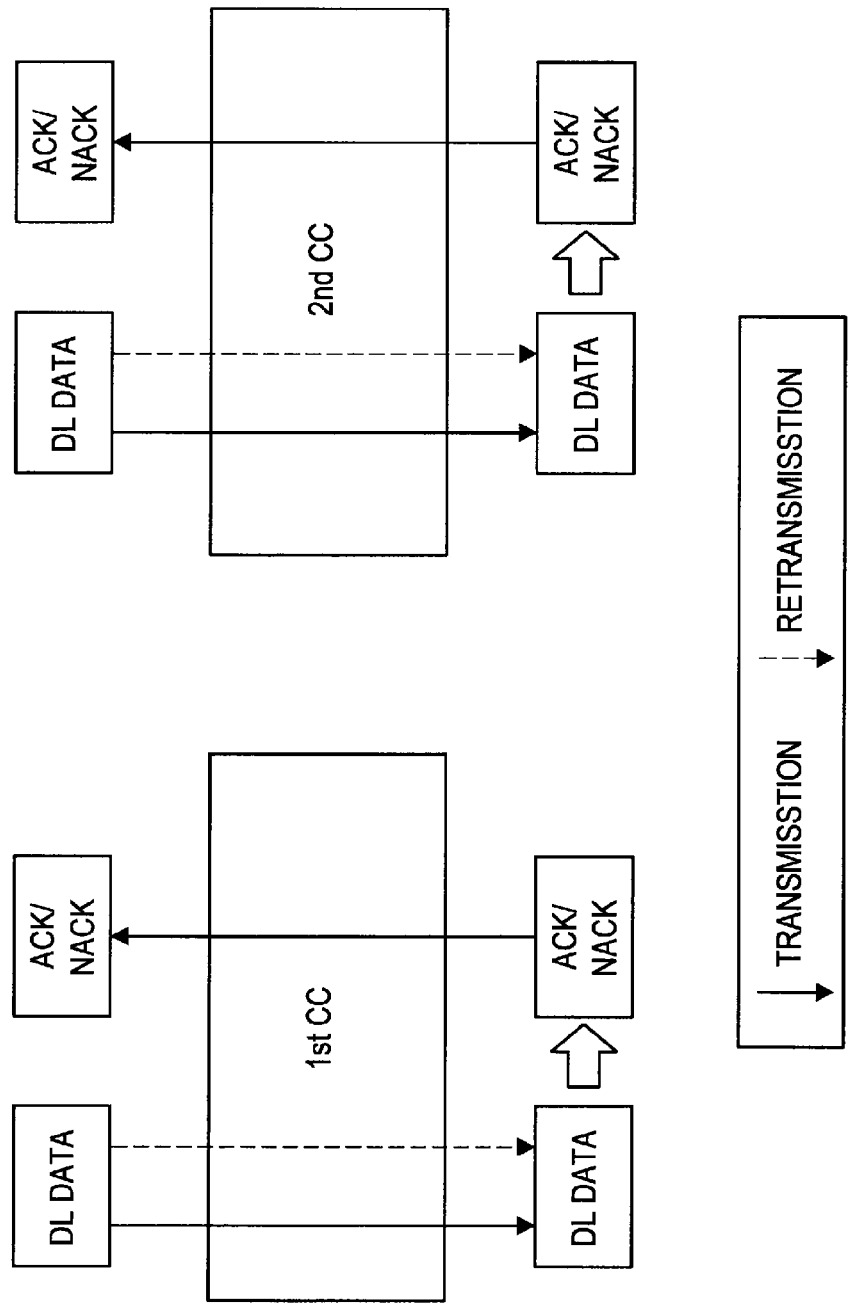
FIG. 4 is an explanatory diagram for describing an example of retransmission control in the case of dual connectivity.

FIG. 4 is an explanatory diagram for describing an example of retransmission control in the case of dual connectivity. Referring to FIG. 4, a first CC and a second CC are illustrated. The UE supports dual connectivity and uses, for example, each of the first CC and the second CC as the PCC. The eNB performs transmission of downlink data using the first CC, and the UE transmits an ACK/NACK for the downlink data using the first CC. When the ACK for the downlink data is not received, the eNB performs retransmission of the downlink data using the first CC. Further, the eNB performs transmission of downlink data using the second CC, and the UE transmits the ACK/NACK for the downlink data using the second CC. When the ACK for the downlink data is not received, the eNB performs retransmission of the downlink data using the second CC.

As described above, in any case, the same frequency band (for example, CC) is used for transmission and retransmission of downlink data.

(d) Downlink Control Information

The eNB transmits downlink control information (DCI) for transmission/retransmission of downlink data at the time of transmission/retransmission of downlink data. In LTE, each piece of DCI is information according to one of a plurality of DCI formats. An example of the DCI format will be described below.

Figure 5:
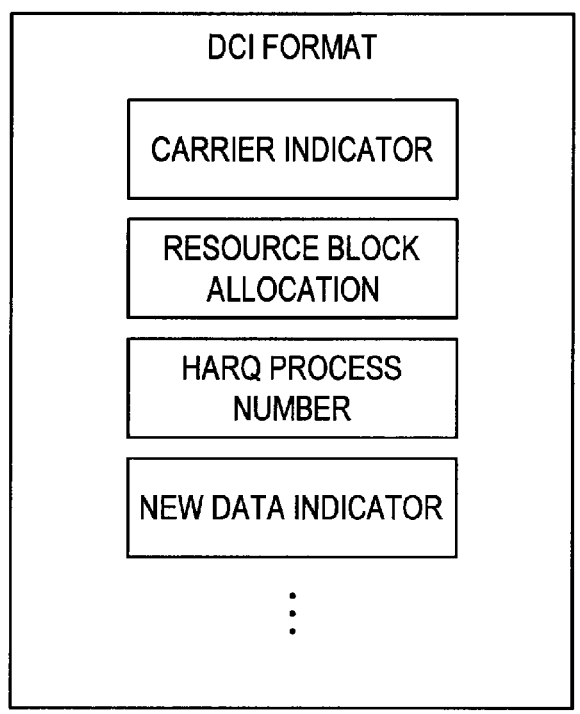
FIG. 5 is an explanatory diagram for describing an example of a DCI format.

FIG. 5 is an explanatory diagram for describing an example of the DCI format. Referring to FIG. 5, the DCI format is illustrated. For example, the DCI format includes fields such as a carrier indicator, resource block allocation, a HARQ process number, and a new data indicator (NDI). The carrier indicator field (CIF) is a field indicating a component carrier in the case of carrier aggregation. The resource block allocation field is a field indicating resource blocks allocated to the UE (that is, resource blocks allocated for transmission of downlink data). The HARQ process number field is a field indicating the HARQ process for downlink data. The NDI field is a field indicating whether the reason for resource allocation is transmission of new data or retransmission.

<<2. Schematic Configuration of System>>

Figure 6:
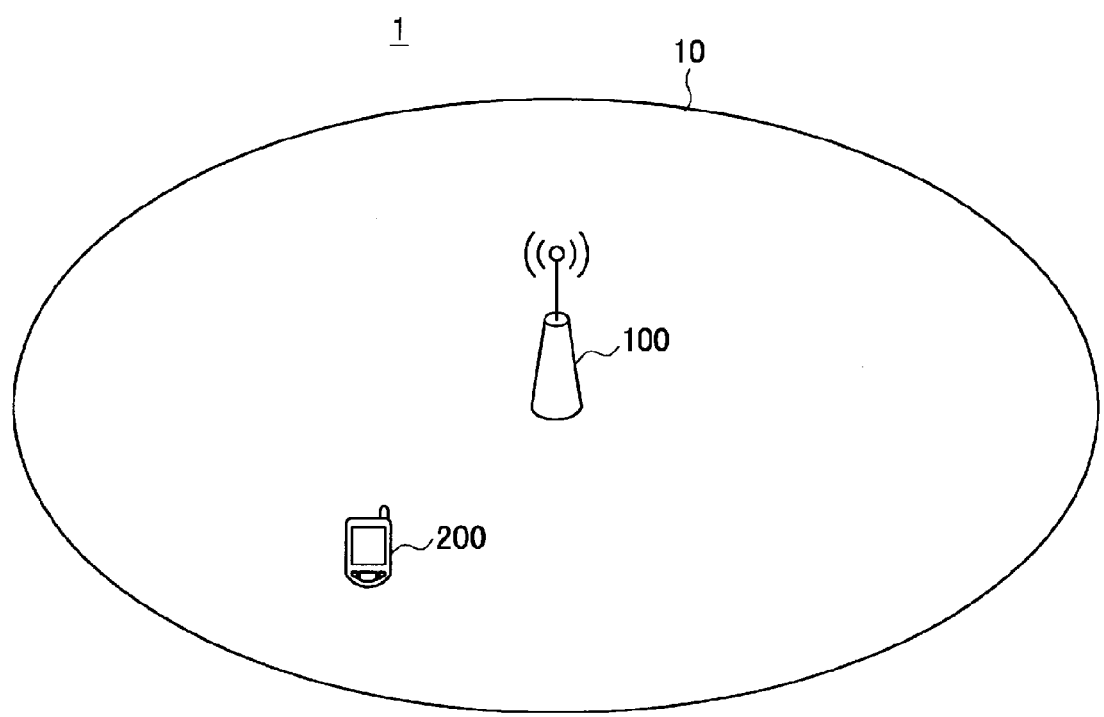
FIG. 6 is an explanatory diagram illustrating an example of a schematic configuration of a system according to an embodiment of the present disclosure.

Next, a schematic configuration of a system according to an embodiment of the present disclosure will be described with reference to FIG. 6. FIG. 6 is an explanatory diagram illustrating an example of a schematic configuration of a system 1 according to an embodiment of the present disclosure. Referring to FIG. 6, the system 1 includes a base station 100 and a terminal device 200.

(Base Station 100)

The base station 100 is a base station of the cellular system. For example, the cellular system is a system conforming to LTE, LTE-Advanced, and a communication standard equivalent thereto.

(a) Frequency Band

Cellular Band

The base station 100 performs wireless communication using a frequency band for the cellular system (hereinafter referred to as a "cellular band"). For example, the cellular band is a component carrier (CC) for the cellular system.

The cellular band is a licensed band or a frequency band included in the licensed band.

Shared Band

Particularly, in an embodiment of the present disclosure, the base station 100 further performs wireless communication using a frequency band shared by a plurality of wireless communication systems including the cellular system (hereinafter referred to as a "shared band").

As an example, a plurality of wireless communication systems include the wireless LAN, and the shared band is the channel of the wireless LAN. More specifically, for example, the shared band is a channel of a band of 5 GHz (or a band of 2.4 GHz) and a bandwidth of 20 MHz. It will be appreciated that the shared band is not limited to this example and may be any other frequency band which is shared by a plurality of wireless communication systems.

The shared band is an unlicensed band or a frequency band included in the unlicensed band.

(b) Wireless Communication with Terminal Device

The base station 100 performs wireless communication with a terminal device (for example, the terminal device 200). For example, the base station 100 performs wireless communication with a terminal device located within a cell 10 of the base station 100. More specifically, for example, the base station 100 transmits a downlink signal to the terminal device, and receives an uplink signal from the terminal device.

(Terminal Device 200)

For example, the terminal device 200 performs wireless communication with a base station (for example, the base station 100). For example, when the terminal device 200 is located within a cell of a base station (for example, the cell 10 of the base station 100), the terminal device 200 performs wireless communication with the base station. Specifically, for example, the terminal device 200 receives the downlink signal from the base station and transmits the uplink signal to the base station.

The terminal device 200 performs wireless communication with the base station 100 using the cellular band. Particularly, in an embodiment of the present disclosure, the terminal device 200 further performs wireless communication with the base station 100 using the shared band.

For example, the terminal device 200 supports carrier aggregation. In other words, the terminal device 200 can perform wireless communication using two or more component carriers (CC) at the same time.

<<3. Configuration of Each Device>>

Next, an example of configurations of the base station 100 and the terminal device 200 according to an embodiment of the present disclosure will be described with reference to FIGS. 7 and 8.

<3.1. Configuration of Base Station>

Next, an example of the configuration of a base station 100 according to an embodiment of the present disclosure will be described with reference to FIG. 7. FIG. 7 is a block diagram illustrating an example of the configuration of the base station 100 according to an embodiment of the present disclosure. Referring to FIG. 7, the base station 100 is equipped with an antenna unit 110, a wireless communication unit 120, a network communication unit 130, a storage unit 140, and a processing unit 150.

(Antenna Unit 110)

The antenna unit 110 emits a signal output by the wireless communication unit 120 into space as a radio wave. Additionally, the antenna unit 110 converts a radio wave from space into a signal, and outputs the signal to the wireless communication unit 120.

(Wireless Communication Unit 120)

The wireless communication unit 120 performs transmission and reception of a signal. For example, the wireless communication unit 120 performs transmission and reception of a signal using the cellular band (that is, the frequency band for the cellular system) and/or the shared band (that is, the frequency band shared by a plurality of wireless communication systems). For example, the wireless communication unit 120 transmits the downlink signal to the terminal device, and receives the uplink signal from the terminal device.

(Network Communication Unit 130)

The network communication unit 130 performs transmission and reception of information. For example, the network communication unit 130 transmits information to another node, and receives information from another node. For example, another node includes another base station and a core network node.

(Storage Unit 140)

The storage unit 140 temporarily or permanently stores programs and data for the operation of the base station 100.

(Processing Unit 150)

The processing unit 150 provides various functions of the base station 100. The processing unit 150 includes an information acquiring unit 151 and a control unit 153. The processing unit 150 may further include any other component in addition to these components. In other words, the processing unit 150 can perform an operation other than operations of these components.

(Information Acquiring Unit 151)

The information acquiring unit 151 acquires information for the control unit 153. For example, the information acquiring unit 151 acquires downlink data.

(Control Unit 153)

The control unit 153 controls transmission of downlink data by the base station 100.

<3.2. Configuration of Terminal Device>

Next, an example of the configuration of terminal device 200 according to an embodiment of the present disclosure will be described with reference to FIG. 8. FIG. 8 is a block diagram illustrating an example of the configuration of the terminal device 200 according to an embodiment of the present disclosure. Referring to FIG. 8, the terminal device 200 is equipped with an antenna unit 210, a wireless communication unit 220, a storage unit 230, and a processing unit 240.

(Antenna Unit 210)

The antenna unit 210 emits a signal output by the wireless communication unit 220 into space as a radio wave. Additionally, the antenna unit 210 converts a radio wave from space into a signal, and outputs the signal to the wireless communication unit 220.

(Wireless Communication Unit 220)

The wireless communication unit 220 performs transmission and reception of a signal. For example, the wireless communication unit 220 performs transmission and reception of a signal using the cellular band (that is, the frequency band for the cellular system) and/or the shared band (that is, the frequency band shared by a plurality of wireless communication systems). For example, the wireless communication unit 120 receives the downlink signal from the base station, and transmits the uplink signal to the base station.

(Storage Unit 230)

The storage unit 230 temporarily or permanently stores programs and data for the operation of the terminal device 200.

(Processing Unit 240)

The processing unit 240 provides various functions of the terminal device 200. The processing unit 240 includes an information acquiring unit 241 and a control unit 243. The processing unit 240 may further include any other component in addition to these components. In other words, the processing unit 240 can perform an operation other than operations of these components.

(Information Acquiring Unit 241)

The information acquiring unit 241 acquires information for the control unit 243.

(Control Unit 243)

The control unit 243 performs a receiving side process in a retransmission control process. For example, the retransmission control process is the HARQ process.

<<4. Technical Characteristics According to Embodiment of Present Disclosure>>

Next, technical characteristics according to an embodiment of the present disclosure will be described with reference to FIGS. 9 to 18.

<4.1. Technical Characteristics Regarding Base Station>

First, technical characteristics regarding base station 100 will be described with reference to FIGS. 9 to 18.

(Retransmission of the Downlink Data)

The base station 100 performs transmission of downlink data using the shared band (that is, the frequency band shared by a plurality of wireless communication systems including the cellular system). The control unit 153 controls transmission of downlink data in a manner that transmission of downlink data is performed using the shared band.

Further, the base station 100 performs retransmission of the downlink data using the cellular band (that is, the frequency band for the cellular system). The control unit 153 controls the retransmission of the downlink data in a manner that the retransmission of the downlink data is performed using the cellular band.

In other words, the base station 100 performs transmission of downlink data using the shared band and performs retransmission of the downlink data using the cellular band.

(a) Downlink Data

For example, the downlink data is downlink data transmitted to the terminal device 200.

As an example, the downlink data is a transport block. The downlink data is not limited to this example and may be any other data.

For example, the base station 100 transmits a first bit string generated by encoding the downlink data in the transmission of the downlink data, and transmits a second bit string generated by encoding the downlink data in the retransmission of the downlink data. The second bit string may be the same bit string as the first bit string or may be a different bit string from the first bit string. Specifically, chase combining may be applied in the HARQ process, and the second bit string may be the same bit string as the first bit string. Alternatively, incremental redundancy may be applied in the HARQ process, and the second bit string may be a different bit string from the first bit string.

(b) Cellular Band and Shared Band

L-CC and U-CC

For example, the cellular band and the shared band are component carriers (CCs) for the terminal device 200. As described above, the cellular band is the licensed band or the frequency band included in the licensed band and thus can be called a licensed component carrier (L-CC). As described above, the shared band is the unlicensed band or the frequency band included in the unlicensed band and thus can be called an unlicensed component carrier (U-CC).

Carrier Aggregation

For example, the shared band is the secondary component carrier (SCC) for the terminal device 200, and the cellular band is the primary component carrier (PCC) or the SCC for the terminal device 200. In other words, the terminal device 200 performs transmission of the downlink data using the shared band serving as the SCC, and performs retransmission of the downlink data using the cellular band serving as the PCC or the SCC.

Example of Shared Band

As described above, as an example, the shared band is the channel of the wireless LAN. More specifically, for example, the shared band is a channel of a band of 5 GHz (or a band of 2.4 GHz) and has a bandwidth of 20 MHz.

It will be appreciated that the shared band is not limited to this example and may be any other frequency band which is shared by a plurality of wireless communication systems.

(c) Example of Transmission and Retransmission

Figure 9:
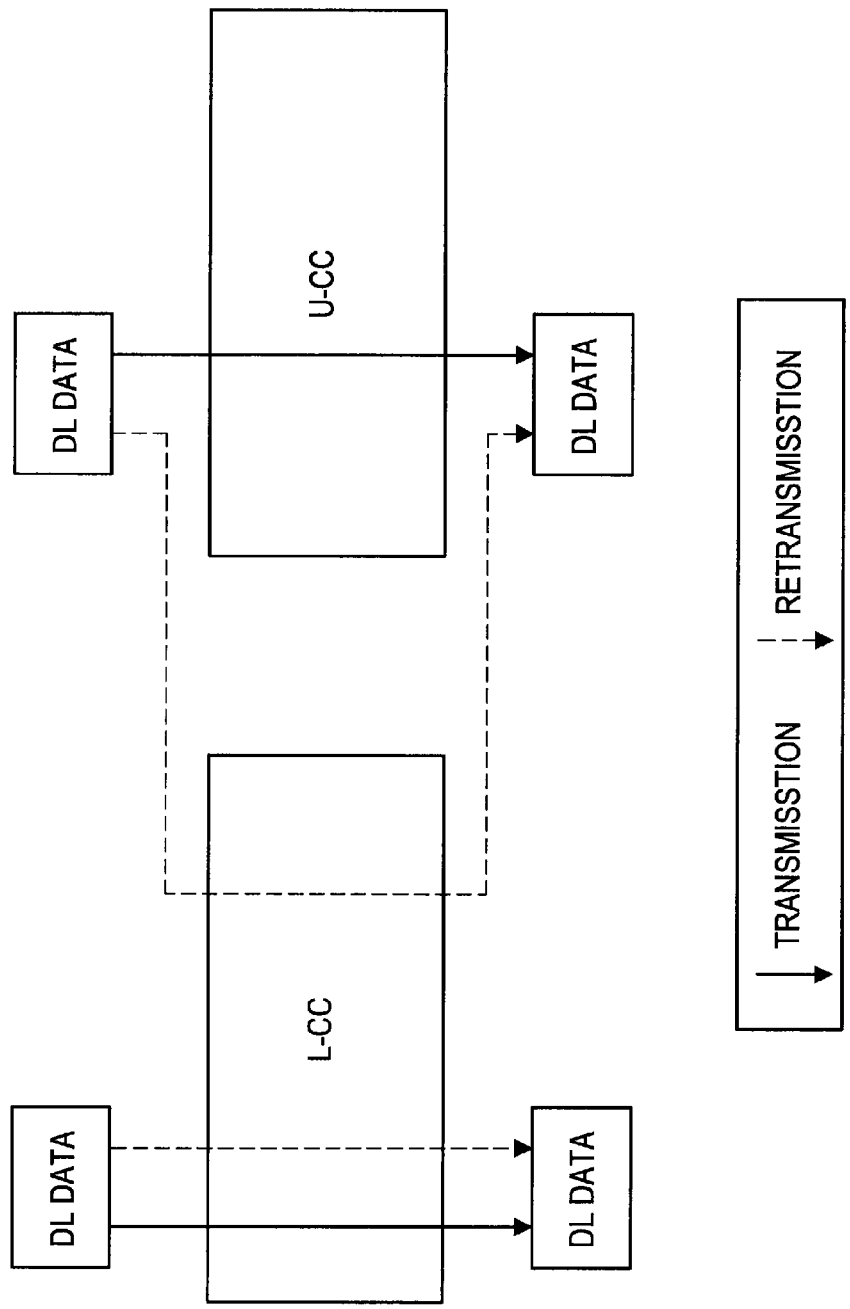
FIG. 9 is an explanatory diagram for describing an example of transmission and retransmission of downlink data according to the embodiment.

FIG. 9 is an explanatory diagram for describing an example of transmission and retransmission of the downlink data according to an embodiment of the present disclosure. Referring to FIG. 9, the L-CC (the cellular band) and the U-CC (the shared band) are illustrated. The base station 100 performs transmission of the downlink data using the L-CC. When an ACK for the downlink data is not received, the base station 100 performs retransmission of the downlink data using the L-CC. The base station 100 performs transmission of the downlink data using the U-CC. When the ACK for the downlink data is not received, the base station 100 performs retransmission of the downlink data using the L-CC rather than the U-CC. As described above, transmission of the downlink data is performed using the U-CC, but the retransmission of the downlink data is performed using the L-CC.

(d) Example of Control

Transmission Using Shared Band

As described above, the control unit 153 controls transmission of the downlink data in a manner that transmission of the downlink data is performed using the shared band.

As an example, the control unit 153 controls transmission of the downlink data by allocating radio resources (for example, resource blocks) of the shared band to the terminal device 200 for transmission of the downlink data. As a result, the base station 100 performs transmission of the downlink data using the shared band.

Retransmission Using Cellular Band

As described above, the control unit 153 controls the retransmission of the downlink data in a manner that the retransmission of the downlink data is performed using the cellular band.

As an example, the control unit 153 controls retransmission of the downlink data by allocating radio resources (for example, resource blocks) of the cellular band to the terminal device 200 for retransmission of the downlink data. As a result, the base station 100 performs retransmission of the downlink data using the cellular band.

(e) Period

Retransmission with No Period Restriction

For example, the base station 100 performs retransmission of the downlink data (which has been transmitted using the shared band) using the cellular band with no period restriction. In other words, the control unit 153 controls the retransmission of the downlink data in a manner that the retransmission of the downlink data is performed using the cellular band with no period restriction.

Retransmission in Limited Period

The base station 100 may perform the retransmission of the downlink data (which has been transmitted using the shared band) using the cellular band within a limited period. In other words, the control unit 153 may control the retransmission of the downlink data in a manner that the retransmission of the downlink data is performed using the cellular band within the limited period.

Further, the limited period may be a period corresponding to an end time of the use of the shared band by the base station 100.

Use of Shared Band by Base Station 100

For example, the base station 100 performs wireless communication using the shared band in a certain period and then releases the shared band for other wireless communication systems. This point will be described below with reference to FIG. 10 using a specific example.

Figure 10:
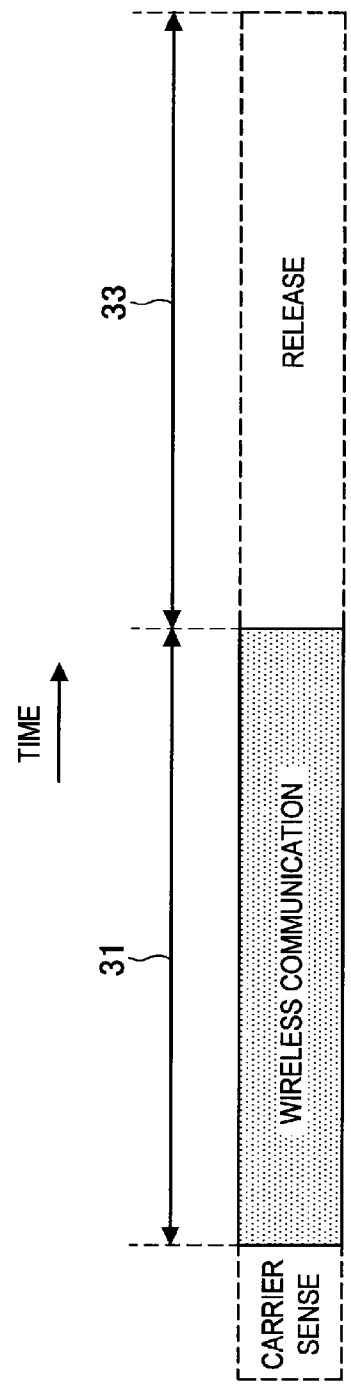
FIG. 10 is an explanatory diagram for describing an example of use of a shared band by a base station.

FIG. 10 is an explanatory diagram for describing an example of the use of the shared band by the base station 100. In this example, the U-CC (the shared band) is the channel of the wireless LAN. The base station 100 secures the U-CC (the channel of the wireless LAN) through the carrier sense, and performs wireless communication using the U-CC in a period 31. Thereafter, the base station 100 releases the U-CC at least in a period 33. In other words, the base station 100 does not use the U-CC at least in the period 33. For example, the period 31 and the period 33 have the same duration. As an example, the period 31 and the period 33 are periods of 500 ms. Accordingly, fairness is maintained between the cellular system and the wireless LAN.

As described above, when the base station 100 uses the shared band in a certain period, the end time of the use of the shared band by the base station 100 is decided according to a start time of the use of the shared band. In other words, the end time is predictable.

First Example of Limited Period

As a first example, the limited period may be a period starting at a predetermined time before the end time. This point will be described below with reference to FIG. 11 using a specific example.

Figure 11:
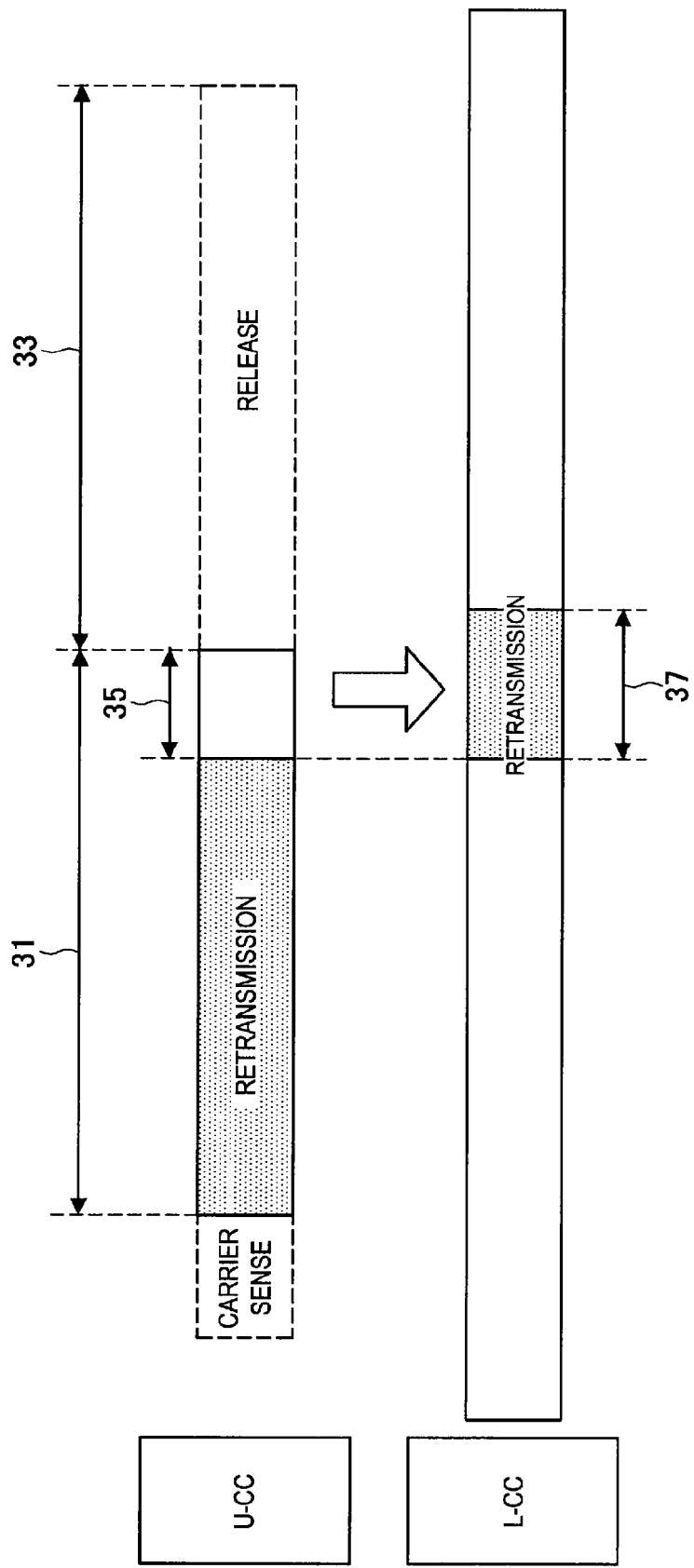
FIG. 11 is an explanatory diagram for describing a first example of a limited period in which retransmission of downlink data is performed using a cellular band.

FIG. 11 is an explanatory diagram for describing the first example of the limited period in which the retransmission of the downlink data is performed using the cellular band. Referring to FIG. 11, similarly to FIG. 10, the base station 100 performs wireless communication using the U-CC (the shared band) serving as the channel of the wireless LAN in the period 31, and then does not perform wireless communication using the U-CC at least in the period 33. In this case, the base station 100 uses the L-CC (the cellular band) instead of the U-CC to perform retransmission of the downlink data which has been transmitted using the U-CC within a period 37 starting at a predetermined time 35 before the end time (that is, the end time of the period 31) of the use of the U-CC. The base station 100 uses the U-CC to perform retransmission of the downlink data which has been transmitted using the U-CC within a period which is included in the period 31 but not included in the period 37.

Second Example of Limited Period

As a second example, the limited period may be a period starting from the end time. This point will be described below with reference to FIG. 12 using a specific example.

Figure 12:
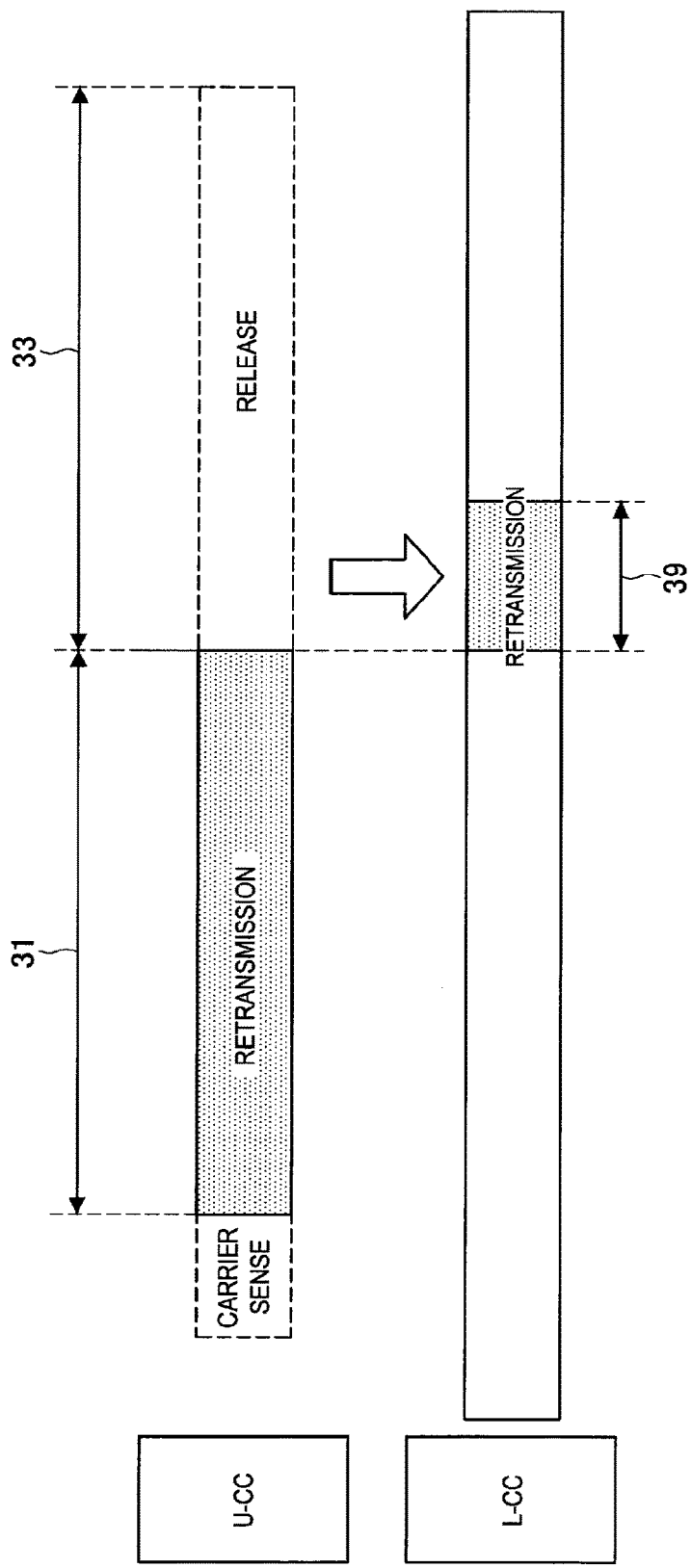
FIG. 12 is an explanatory diagram for describing a second example of a limited period in which retransmission of downlink data is performed using a cellular band.

FIG. 12 is an explanatory diagram for describing the second example of the limited period in which the retransmission of the downlink data is performed using the cellular band. Referring to FIG. 12, similarly to FIG. 10, the base station 100 performs wireless communication using the U-CC (the shared band) serving as the channel of the wireless LAN in the period 31, and then does not perform wireless communication using the U-CC at least in the period 33. In this case, the base station 100 uses the L-CC instead of the U-CC to perform retransmission of the downlink data which has been transmitted using the U-CC within a period 39 starting from the end time of the use of the U-CC (that is, the end time of the period 31). The base station 100 uses the U-CC to perform retransmission of the downlink data which has been transmitted using the U-CC within the period 31.

As described above, the base station 100 may perform the retransmission of the downlink data using the cellular band instead of the shared band within the period corresponding to the end time of the use of the shared band by the base station 100. Accordingly, for example, it is possible to prevent a situation in which the base station 100 is unable to use the shared band and thus it is unable to perform the retransmission of the downlink data. Further, for example, consumption of the radio resources of the cellular band is suppressed, compared to the case in which the cellular band is used for retransmission of all downlink data which has been transmitted using the shared band.

In an embodiment of the present disclosure, the limited period is not limited to a period corresponding to the end time. The limited period may be any other period.

(f) Reception of ACK/NACK

The terminal device 200 transmits an ACK/NACK for the downlink data in response to transmission of the downlink data by the base station 100. For example, the ACK/NACK is transmitted using the PCC of the terminal device 200.

First Example

As a first example, the shared band is the SCC, and the cellular band is the PCC. In this case, an ACK/NACK for the downlink data is transmitted using the cellular band. A specific example will be described below with reference to FIG. 13.

Figure 13:
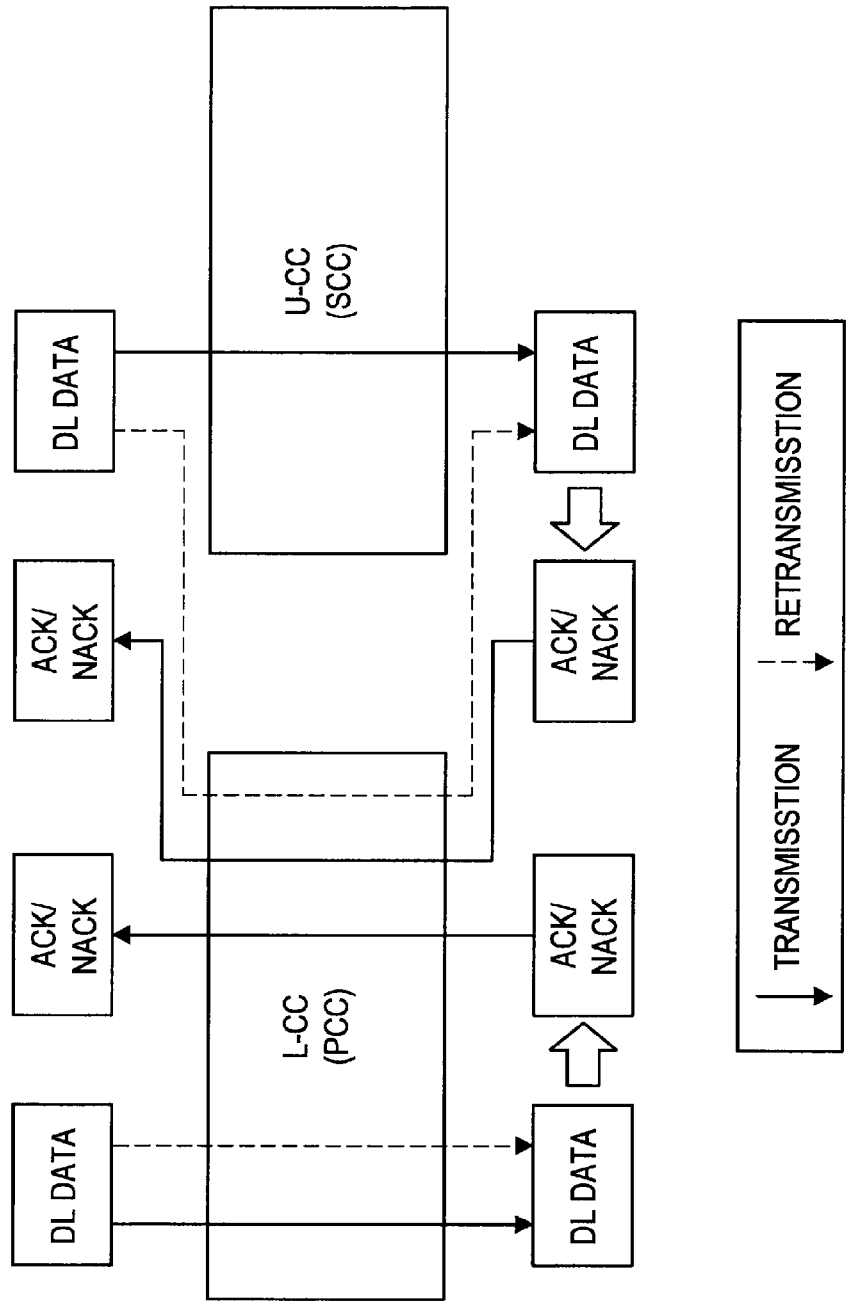
FIG. 13 is an explanatory diagram for describing a first example of transmission of an ACK/NACK in response to downlink data.

FIG. 13 is an explanatory diagram for describing the first example of transmission of an ACK/NACK for the downlink data. Referring to FIG. 13, the L-CC (the cellular band) serving as the PCC and the U-CC (the shared band) serving as the SCC are illustrated. The terminal device 200 uses the L-CC (the PCC) to transmit the ACK/NACK for the downlink data transmitted by the base station 100 using the L-CC. Further, the terminal device 200 uses the L-CC (the PCC) to transmit the ACK/NACK for the downlink data transmitted by the base station 100 using the U-CC. The base station 100 uses the L-CC to perform retransmission of the downlink data transmitted by the base station 100 using the U-CC.

Second Example

As a second example, the shared band and the cellular band may be the SCC, and other cellular bands may be the PCC. In this case, the ACK/NACK for the downlink data may be transmitted using other cellular bands. A specific example will be described below with reference to FIG. 14.

Figure 14:
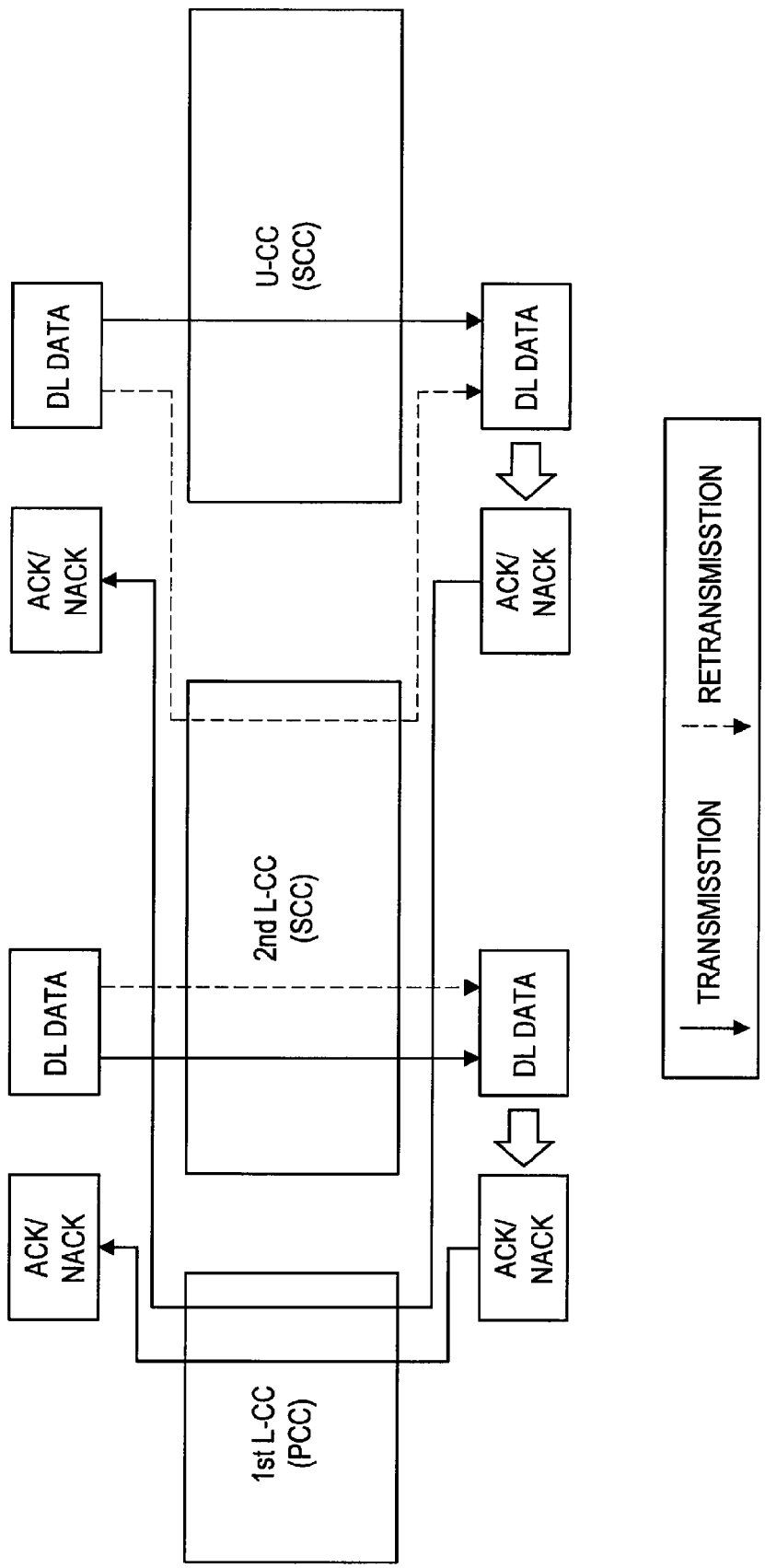
FIG. 14 is an explanatory diagram for describing a second example of transmission of an ACK/NACK in response to downlink data.

FIG. 14 is an explanatory diagram for describing the second example of transmission of the ACK/NACK for the downlink data. Referring to FIG. 14, the first the L-CC (the first the cellular band) serving as the PCC, the second the L-CC (the second the cellular band) serving as the SCC, and the U-CC (the shared band) serving as the SCC are illustrated. The terminal device 200 uses the first L-CC (the PCC) to transmit the ACK/NACK for the downlink data transmitted by the base station 100 using the second L-CC. Further, the terminal device 200 uses the first L-CC (the PCC) to transmit the ACK/NACK for the downlink data transmitted by the base station 100 using the U-CC. The base station 100 uses the second L-CC to perform retransmission of the downlink data transmitted by the base station 100 using the U-CC.

As described above, the base station 100 performs transmission of the downlink data using the shared band, and performs retransmission of the downlink data using the cellular band. Accordingly, for example, when the shared band is used in the cellular system, it is possible to retransmit the downlink data with a high degree of certainty. For example, since the base station 100 is unable to use the shared band, it is possible to prevent a situation in which it is difficult to perform the retransmission of the downlink data. Further, for example, at the time of the retransmission of the downlink data, collision with signals of another wireless communication system is prevented.

(Transmission of Downlink Control Information)

As described above, the base station 100 performs transmission of the downlink data using the shared band, and performs retransmission of the downlink data using the cellular band. Further, for example, the base station 100 transmits the downlink control information (DCI) for the retransmission of the downlink data. The control unit 153 controls the transmission of the DCI for the retransmission of the downlink data.

For example, the DCI indicates the shared band as the shared frequency band used for the transmission of the downlink data. Thus, for example, the terminal device can recognize that the retransmission is the retransmission of the downlink data transmitted using the shared band according to the retransmission of the downlink data performed by the base station 100 using the cellular band.

More specifically, since the transmission and retransmission of the downlink data are commonly performed using the same frequency band, it is not assumed that different frequency bands are used for the transmission and retransmission of the downlink data. For this reason, when no information is provided to the terminal device, the terminal device is unable to associate the transmission of the downlink data performed using the shared band with the retransmission of the downlink data performed using the cellular band. In this regard, when the DCI for the retransmission of the downlink data indicates the shared band as the shared frequency band used for the transmission of the downlink data, the terminal device can associate the retransmission of the downlink data with the transmission of the downlink data. In other words, the terminal device can recognize that the retransmission is the retransmission of the downlink data transmitted using the shared band according to the retransmission.

(a) Format

The DCI for the retransmission of the downlink data is information according to a predetermined format. In other words, the DCI for the retransmission is information according to a predetermined DCI format.

Shared Frequency Band in which Downlink Data is Transmitted

For example, the predetermined format has a field indicating the shared frequency band used for the transmission of the downlink data (the shared frequency band) (hereinafter referred to as a "shared band field").

More specifically, for example, one of two or more bit pattern candidates corresponding to the shared frequency band is included in the shared band field. As an example, there are four shared frequency bands. In this case, the shared band field is a 2-bit field, and one of four bit pattern candidates (00, 01, 10, 00) corresponding to the shared frequency band is included in the shared band field.

For example, the control unit 153 notifies the terminal device of two or more bit pattern candidates included in the shared band field and the shared frequency bands corresponding to the two or more bit patterns. As an example, the control unit 153 reports system information indicating the two or more bit pattern candidates and the shared frequency band. As another example, the control unit 153 may notify the terminal device 200 of the two or more bit pattern candidates and the shared frequency band through individual signaling to the terminal device 200. Thus, for example, the terminal device 200 can specify a specific shared frequency band based on the bit patterns included in the shared band field.

For example, the shared band field is a U-CC indicator field indicating the U-CC used for the transmission of the downlink data.

The CIF of the DCI format merely indicates a frequency band associated with the DCI. In other words, the CIF of the DCI format indicates a frequency band used for the transmission/retransmission of the downlink data serving as a target of the DCI. For this reason, it should be noted that it is not possible to use the CIF instead of the shared band field (for example, the U-CC indicator field). Specifically, when the transmission of the downlink data is performed using the shared band and the retransmission of the downlink data is performed using the cellular band, the DCI for the retransmission indicates the cellular band but is unable to indicate the shared band in the CIF.

Retransmission Control Process

For example, the predetermined format has a field indicating the retransmission control process for the downlink data (hereinafter referred to as a "retransmission control process field").

More specifically, for example, the retransmission control process is the HARQ process, and the retransmission control process field is a HARQ process number field.

Thus, for example, the terminal device 200 can specify the retransmission control process for the downlink data according to the retransmission of the downlink data performed by the base station 100 using the cellular band.

Transmission/Retransmission of New Data

For example, the predetermined format does not include a field indicating whether resource allocation is for transmission of new data or for retransmission. More specifically, for example, the predetermined format does not include a new data indicator (NDI) field.

Accordingly, for example, it is possible to reduce the number of bits of the DCI. As a result, radio resources required for the transmission of the DCI can be saved. Further, the terminal device 200 can determine that the resource allocation of the DCI is for the retransmission based on the fact that the DCI is information according to the predetermined format (that is, a format including the shared band field or the like).

Specific Example of Format

Figure 15:
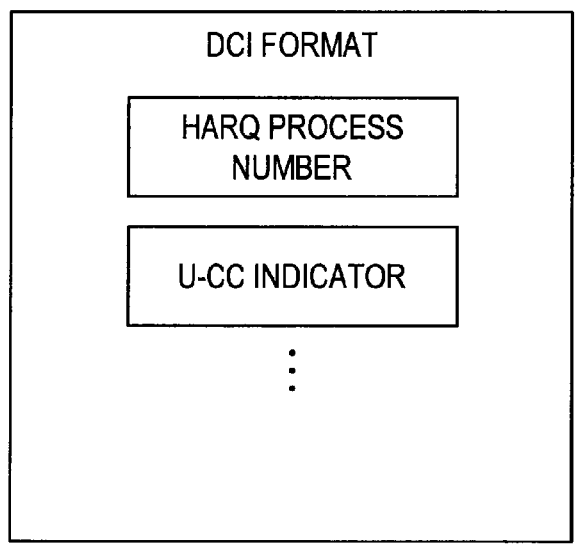
FIG. 15 is an explanatory diagram for describing an example of a predetermined DCI format.

FIG. 15 is an explanatory diagram for describing an example of a predetermined DCI format. Referring to FIG. 15, the DCI format is illustrated. The DCI format includes a HARQ process number field and a U-CC indicator field. The HARQ process number field is a field indicating the HARQ process for the downlink data, and the U-CC indicator field is a field indicating the U-CC used for the transmission of the downlink data. The DCI format may further include any other field such as the carrier indicator or resource block allocation. The DCI format does not include an NDI field.

(b) Frequency Band Used for Transmission

As described above, the base station 100 performs the transmission of the downlink data using the shared band, and performs the retransmission of the downlink data using the cellular band. Further, the base station 100 transmits the DCI for the retransmission of the downlink data using any one frequency band.

First Example

As a first example, the base station 100 transmits the DCI for the retransmission of the downlink data using the cellular band. This point will be described below with reference to FIG. 16 using a specific example.

Figure 16:
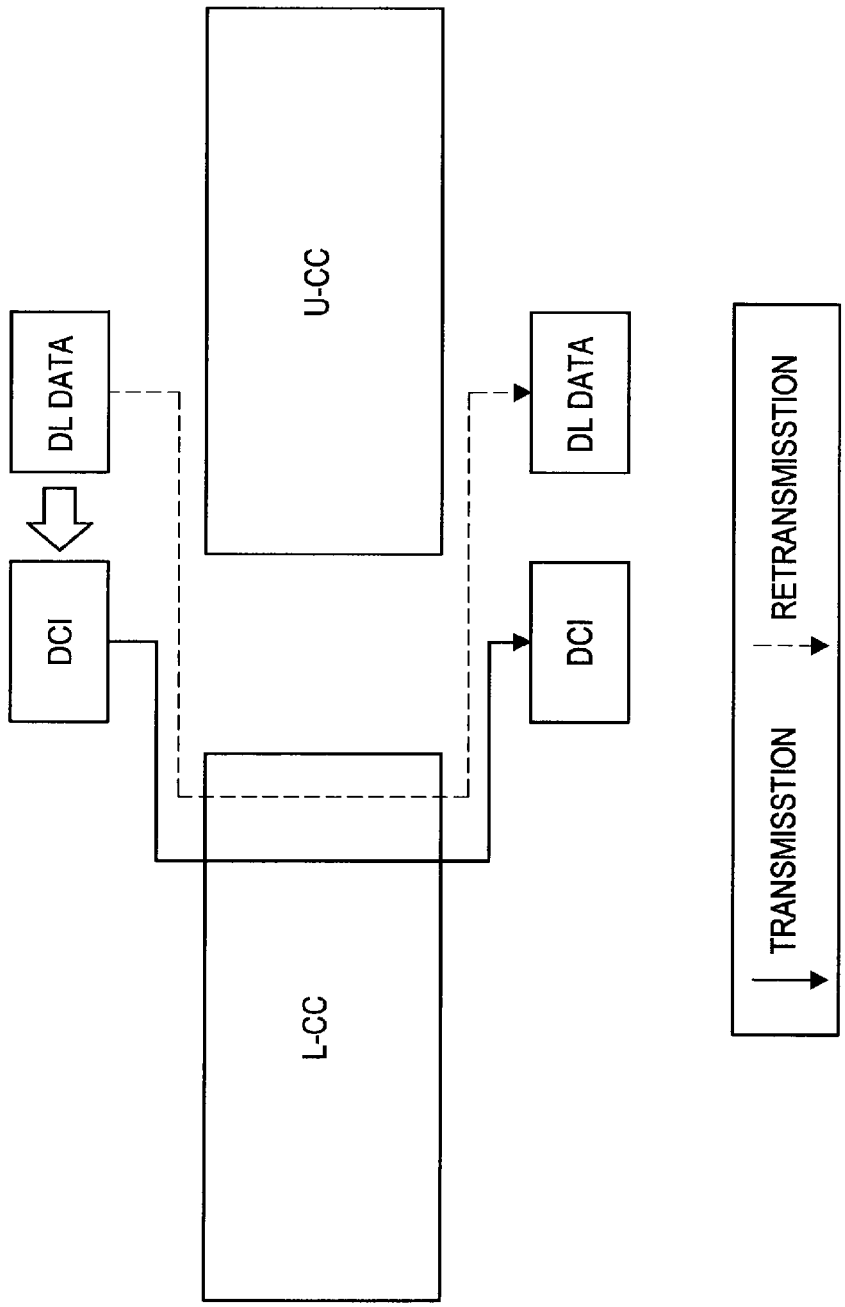
FIG. 16 is an explanatory diagram for describing a first example of transmission of DCI according to retransmission of downlink data.

FIG. 16 is an explanatory diagram for describing the first example of the transmission of the DCI for the retransmission of the downlink data. Referring to FIG. 16, the L-CC (the cellular band) and the U-CC (the shared band) are illustrated. The base station 100 performs the transmission of the downlink data using the U-CC, and performs the retransmission of the downlink data using the L-CC. In this example, the base station 100 transmits the DCI for the retransmission of the downlink data using the L-CC. The U-CC indicator of the DCI indicates the U-CC.

As described above, the DCI for the retransmission of the downlink data is transmitted using the cellular band. Accordingly, for example, similarly to the downlink data, the DCI is also transmitted with a high degree of certainty.

Second Example

As a second example, the base station 100 may transmit the DCI for the retransmission of the downlink data using any other cellular band different from the cellular band. In other words, cross-carrier scheduling may be performed. This point will be described below with reference to FIG. 17 using a specific example.

Figure 17:
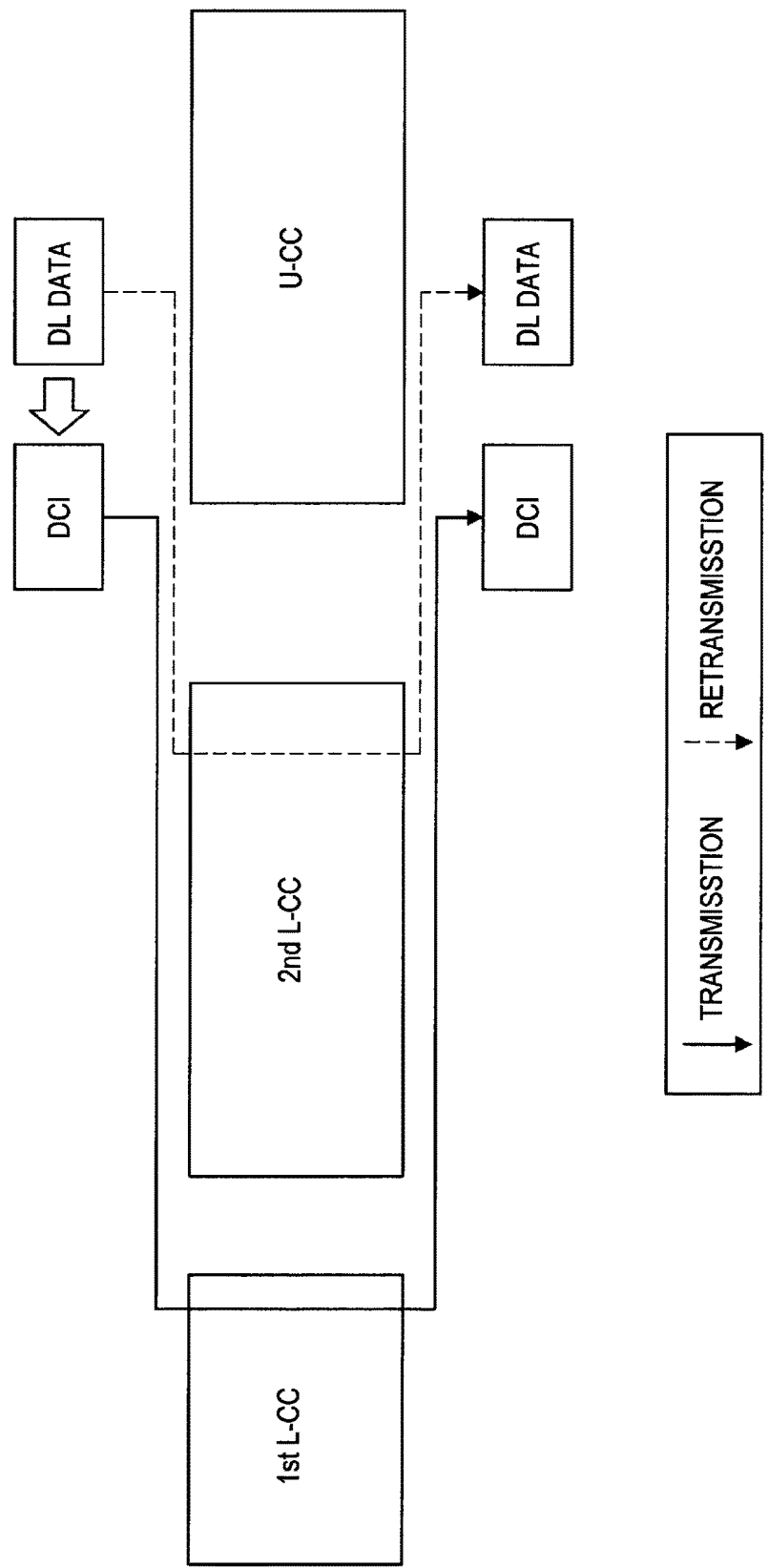
FIG. 17 is an explanatory diagram for describing a second example of transmission of DCI according to retransmission of downlink data.

FIG. 17 is an explanatory diagram for describing the second example of the transmission of the DCI for the retransmission of the downlink data. Referring to FIG. 17, the first L-CC (the first cellular band), the second L-CC, and the U-CC (the shared band) are illustrated. The base station 100 performs the transmission of the downlink data using the U-CC, and performs the retransmission of the downlink data using the second L-CC. In this example, the base station 100 transmits the DCI for the retransmission of the downlink data using the first L-CC. In other words, cross-carrier scheduling is performed. The carrier indicator (CI) of the DCI indicates the second L-CC, and the U-CC indicator of the DCI indicates the U-CC.

As described above, the DCI for the retransmission of the downlink data may be transmitted using any other cellular band. Accordingly, for example, similarly to the downlink data, the DCI is also transmitted with a high degree of certainty.

Third Example

As a third example, the base station 100 transmits the DCI for the retransmission of the downlink data using the shared band. In other words, cross-carrier scheduling may be performed. This point will be described below with reference to FIG. 18 using a specific example.

Figure 18:
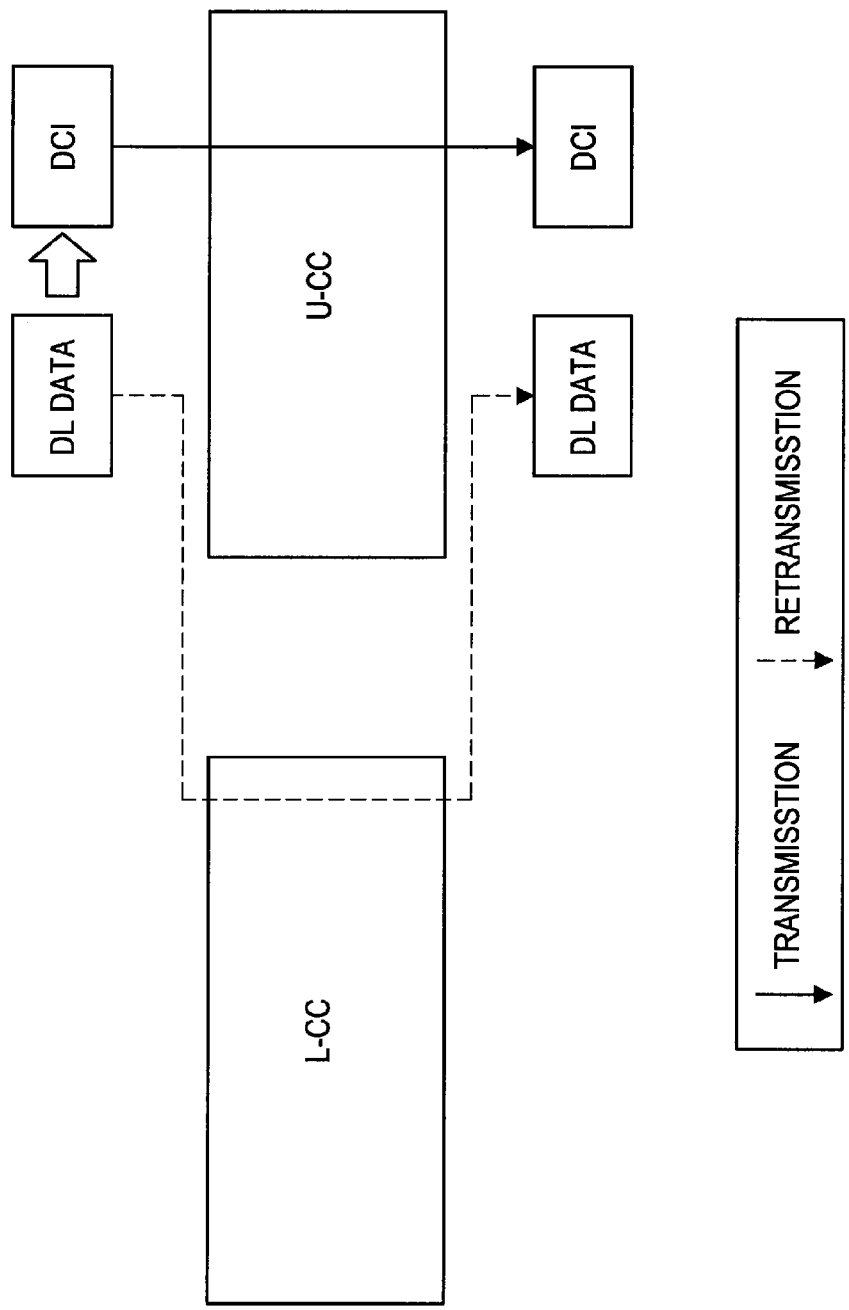
FIG. 18 is an explanatory diagram for describing a third example of transmission of DCI according to retransmission of downlink data.

FIG. 18 is an explanatory diagram for describing the third example of the transmission of the DCI for the retransmission of the downlink data. Referring to FIG. 18, the L-CC (the cellular band) and the U-CC (the shared band) are illustrated. The base station 100 performs the transmission of the downlink data using the U-CC, and performs the retransmission of the downlink data using the L-CC. In this example, the base station 100 transmits the DCI for the retransmission of the downlink data using the U-CC. In other words, cross-carrier scheduling is performed. The carrier indicator (CI) of the DCI indicates the L-CC, and the U-CC indicator of the DCI indicates the U-CC.

(c) Example of Control

As described above, the base station 100 transmits the DCI for the retransmission of the downlink data, and the control unit 153 controls the transmission of the DCI for the retransmission of the downlink data.

As an example, the control unit 153 controls the transmission of the DCI by performing generation of the DCI and/or the transmission process of the DCI (for example, mapping to radio resources or the like).

<4.2. Technical Characteristics Regarding Terminal Device>

Next, technical characteristics regarding terminal device 200 will be described.

(Retransmission Control)

The terminal device 200 (the control unit 243) performs the receiving side process in the retransmission control process according to the transmission of the downlink data performed by the base station 100 using the shared band (that is, the frequency band shared by a plurality of wireless communication systems including the cellular system).

Further, the terminal device 200 (the control unit 243) performs the receiving side process in the retransmission control process according to the retransmission of the downlink data performed by the base station 100 using the cellular band (that is, the frequency band for the cellular system).

(a) Retransmission Control Process and Receiving Side Process

For example, the retransmission control process is the HARQ process. For example, the retransmission control process is the HARQ process of the HARQ entity of the shared band.

For example, the receiving side process includes error checking of the received bit string and the transmission process of the ACK/NACK. Further, for example, the receiving side process includes synthesis of the received bit string (for example, the chase combining, the incremental redundancy, or the like).

(b) Specifying of Retransmission Control Process

For example, the terminal device 200 (the control unit 243) specifies the retransmission control process based on the DCI for the retransmission of the downlink.

(b-1) DCI

For example, the DCI indicates the shared band as the shared frequency band used for the transmission of the downlink data. Accordingly, for example, the terminal device 200 can recognize that the retransmission is the retransmission of the downlink data transmitted using the shared band according to the retransmission of the downlink data performed by the base station 100 using the cellular band.

For example, the DCI indicates the retransmission control process as the retransmission control process for the downlink data. Accordingly, for example, the terminal device 200 can specify the retransmission control process for the downlink data. As a result, the downlink data can be appropriately processed in the retransmission control process.

(b-2) Predetermined Format

The DCI is information according to a predetermined format. The predetermined format has been described above in connection with the base station 100. Thus a repeated description is omitted.

(c) Determination of Transmission/Retransmission of New Data

For example, the terminal device 200 (the control unit 243) determines that the resource allocation of the DCI is for the retransmission based on the fact that the DCI is information according to the predetermined format (that is, a format including the shared band field and the retransmission control process field).

Accordingly, for example, since the DCI may not include the NDI (or similar information), it is possible to reduce the number of bits of the DCI. As a result, radio resources required for the transmission of the DCI can be saved.

Further, when the DCI is information according to a format other than the predetermined format, the terminal device 200 (the control unit 243) determines whether the resource allocation of the DCI is for transmission of new data or for retransmission based on the NDI of the DCI.

<<5. Flow of Process>>

Next, the flow of a process according to an embodiment of the present disclosure will be described with reference to FIGS. 19 to 21.

(Process of Base Station 100)

Figure 19:
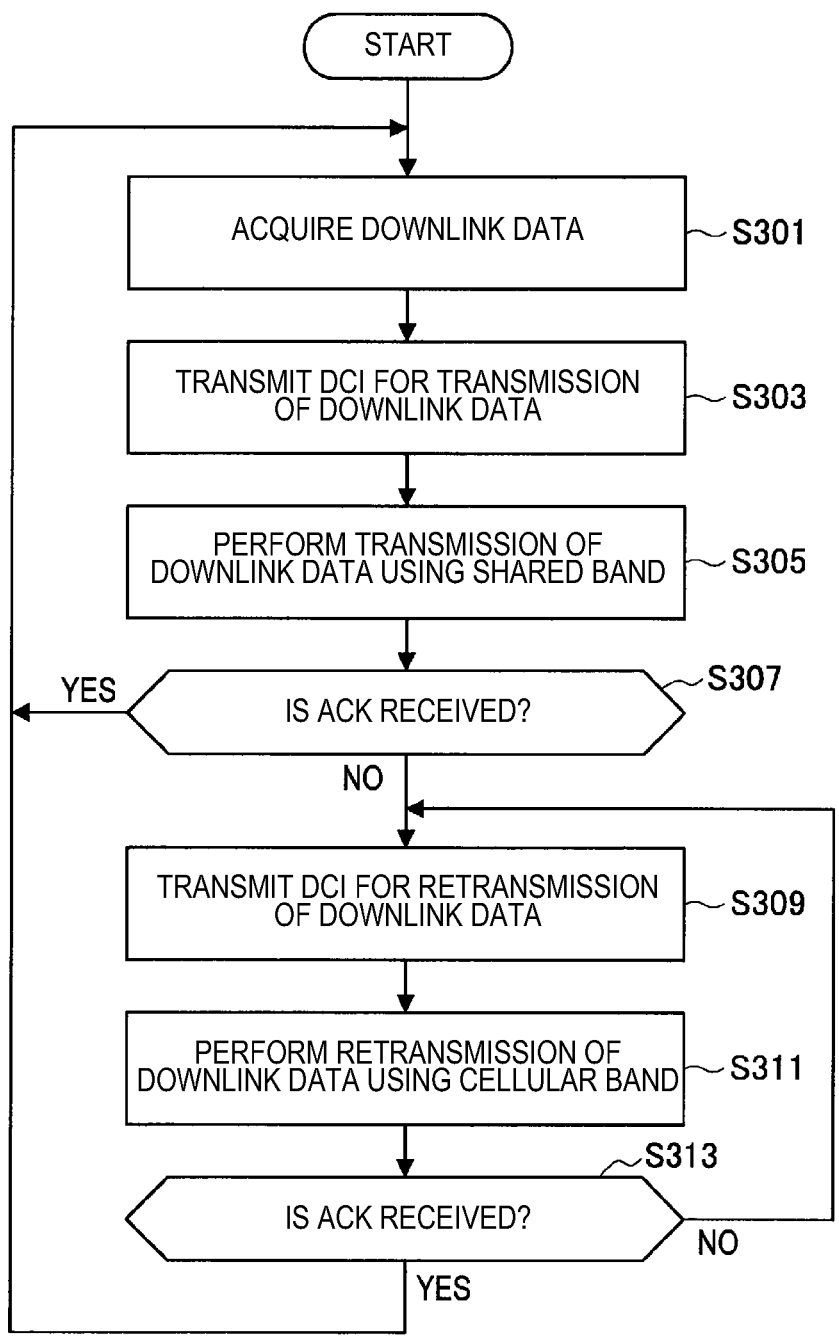
FIG. 19 is a flowchart illustrating an example of a schematic flow of a process of a base station according to the embodiment.

FIG. 19 is a flowchart illustrating an example of a schematic flow of a process of the base station 100 according to an embodiment of the present disclosure. This process is a process focused on the transmission and retransmission of the downlink data.

The information acquiring unit 151 acquires the downlink data (S301).

The base station 100 transmits the DCI for the transmission of the downlink data (S303). Further, the base station 100 performs the transmission of the downlink data using the shared band (that is, the frequency band shared by a plurality of wireless communication systems including the cellular system) (S305). The control unit 153 controls the transmission of the DCI and the transmission of the downlink data.

When the ACK for the downlink data is received (YES in S307), the process returns to step S301.

When the ACK for the downlink data is not received (NO in S307), the base station 100 transmits the DCI for the retransmission of the downlink data (S309). Further, the base station 100 performs the retransmission of the downlink data using the cellular band (that is, the frequency band for the cellular system) (S311). The control unit 153 controls the transmission of the DCI and the retransmission of the downlink data.

When the ACK for the downlink data is received (YES in S313), the process returns to step S301. When the ACK for the downlink data is not received (NO in S313), the process returns to step S309.

(Process of Terminal Device 200)

(a) First Process

Figure 20:
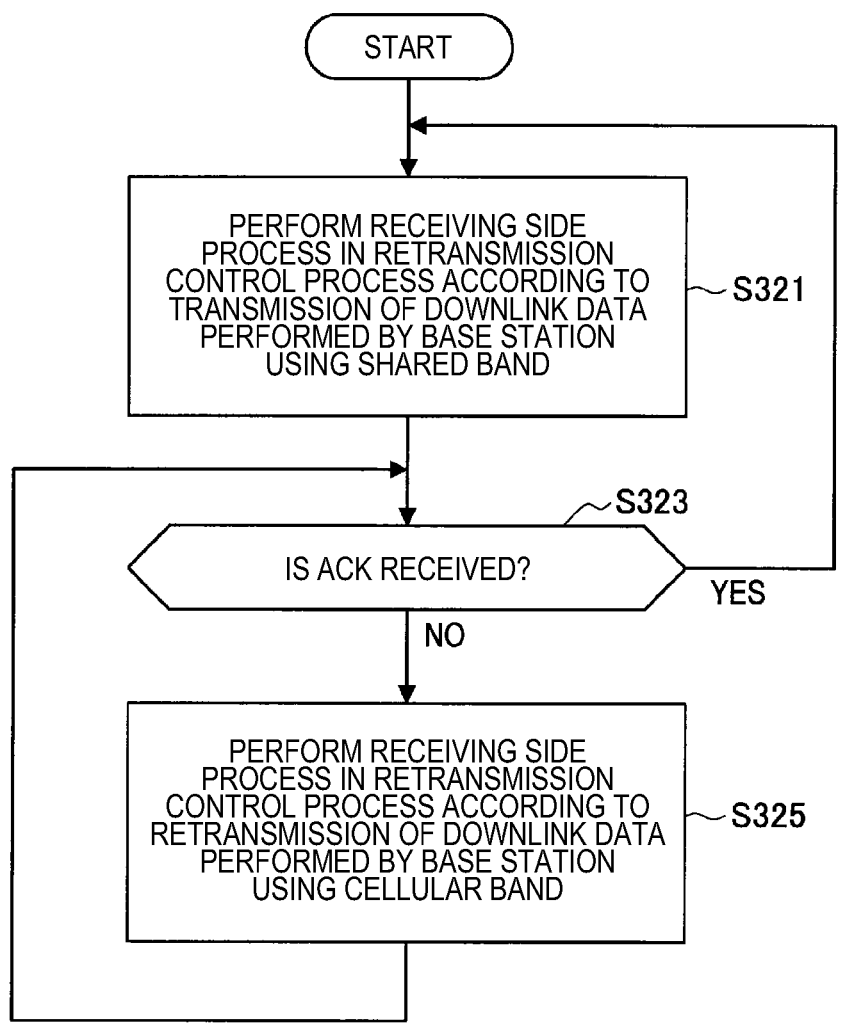
FIG. 20 is a flowchart illustrating an example of a schematic flow of a first process of a terminal device according to the embodiment.

FIG. 20 is a flowchart illustrating an example of a schematic flow of a first process of the terminal device 200 according to an embodiment of the present disclosure. The first process is a process focused on the downlink data which is transmitted using the shared band (that is, the downlink data which is retransmitted using the cellular band).

The terminal device 200 (the control unit 243) performs the receiving side process in the retransmission control process according to the transmission of the downlink data performed by the base station 100 using the shared band (that is, the frequency band shared by a plurality of wireless communication systems including the cellular system) (S321).

When the terminal device 200 transmits the ACK for the downlink data (YES in S323), the process returns to step S321.

When the terminal device 200 does not transmit the ACK for the downlink data (NO in S323), the terminal device 200 (the control unit 243) performs the receiving side process in the retransmission control process according to the retransmission of the downlink data performed by the base station 100 using the cellular band (that is, the frequency band for the cellular system) (S323). Then, the process returns to step S323.

(b) Second Process

Figure 21:
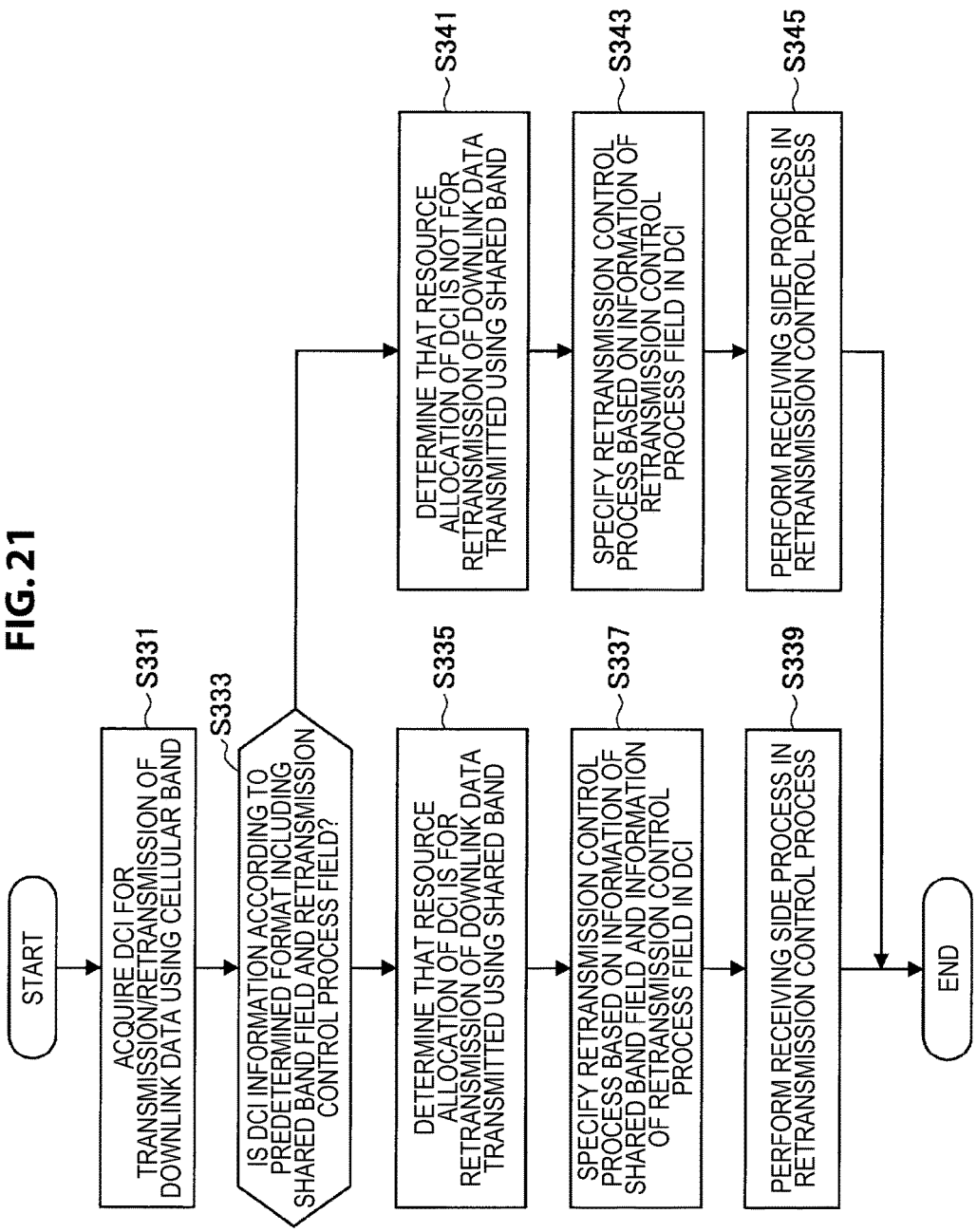
FIG. 21 is a flowchart illustrating an example of a schematic flow of a second process of a terminal device according to the embodiment.

FIG. 21 is a flowchart illustrating an example of a schematic flow of a second process of the terminal device 200 according to an embodiment of the present disclosure. The second process is a process focused on the downlink data which is transmitted/retransmitted using the cellular band.

The terminal device 200 (the control unit 243) acquires the DCI for the transmission/retransmission of the downlink data using the cellular band (S331).

For example, the DCI is information according to a predetermined format including the shared band field (for example, the U-CC indicator field) and the retransmission control process field (for example, the HARQ process number field) (YES in S333). In this case, the terminal device 200 (the control unit 243) determines that the resource allocation of the DCI is for the retransmission of the downlink data transmitted using the shared band (S335). Further, the terminal device 200 (the control unit 243) specifies the retransmission control process for the downlink data based on information of the shared band field and information of the retransmission control process field in the DCI (S337). Then, the terminal device 200 (the control unit 243) performs the receiving side process in the retransmission control process (S339). Then, the process ends.

For example, when the DCI is not information according to a predetermined format (NO in S333), the terminal device 200 (the control unit 243) determines that the resource allocation of the DCI is not for the retransmission of the downlink data transmitted using the shared band (S341). In other words, the terminal device 200 (the control unit 243) determines that the resource allocation of the DCI is for retransmission of the downlink transmitted using the cellular band or transmission of new downlink data. Further, the terminal device 200 (the control unit 243) specifies the retransmission control process for the downlink data based on the information of the retransmission control process field in the DCI (S343). Then, the terminal device 200 (the control unit 243) performs the receiving side process in the retransmission control process (S345). Then, the process ends.

Steps S331 to S339 in the second process correspond to step S325 in the first process.

<<6. Modified Examples>>

Next, a modified example of an embodiment of the present disclosure will be described with reference to FIG. 22.

(Overview of Modified Examples)

In the example of the above-described embodiment of the present disclosure, one base station (the base station 100) performs the transmission of the downlink data using the shared band, and performs the retransmission of the downlink data using the cellular band.

On the other hand, in the modified example of the embodiment of the present disclosure, carrier aggregation (for example, inter-eNB carrier aggregation) is performed between a first base station and a second base station. More specifically, for example, the terminal device performs wireless communication with the first base station using the cellular band, and performs wireless communication with the second base station using the shared band. In this case, the second base station performs the transmission of the downlink data using the shared band, and the first base station performs the retransmission of the downlink data using the cellular band. For example, the shared band is the SCC for the terminal device 200, and the cellular band is the SCC or the PCC for the terminal device 200.

(Example of First Base Station and Second Base Station)

As an example, the first base station is a base station of a macro cell, and the second base station is a base station of a small cell overlapping the macro cell. A specific example will be described below with reference to FIG. 22.

Figure 22:
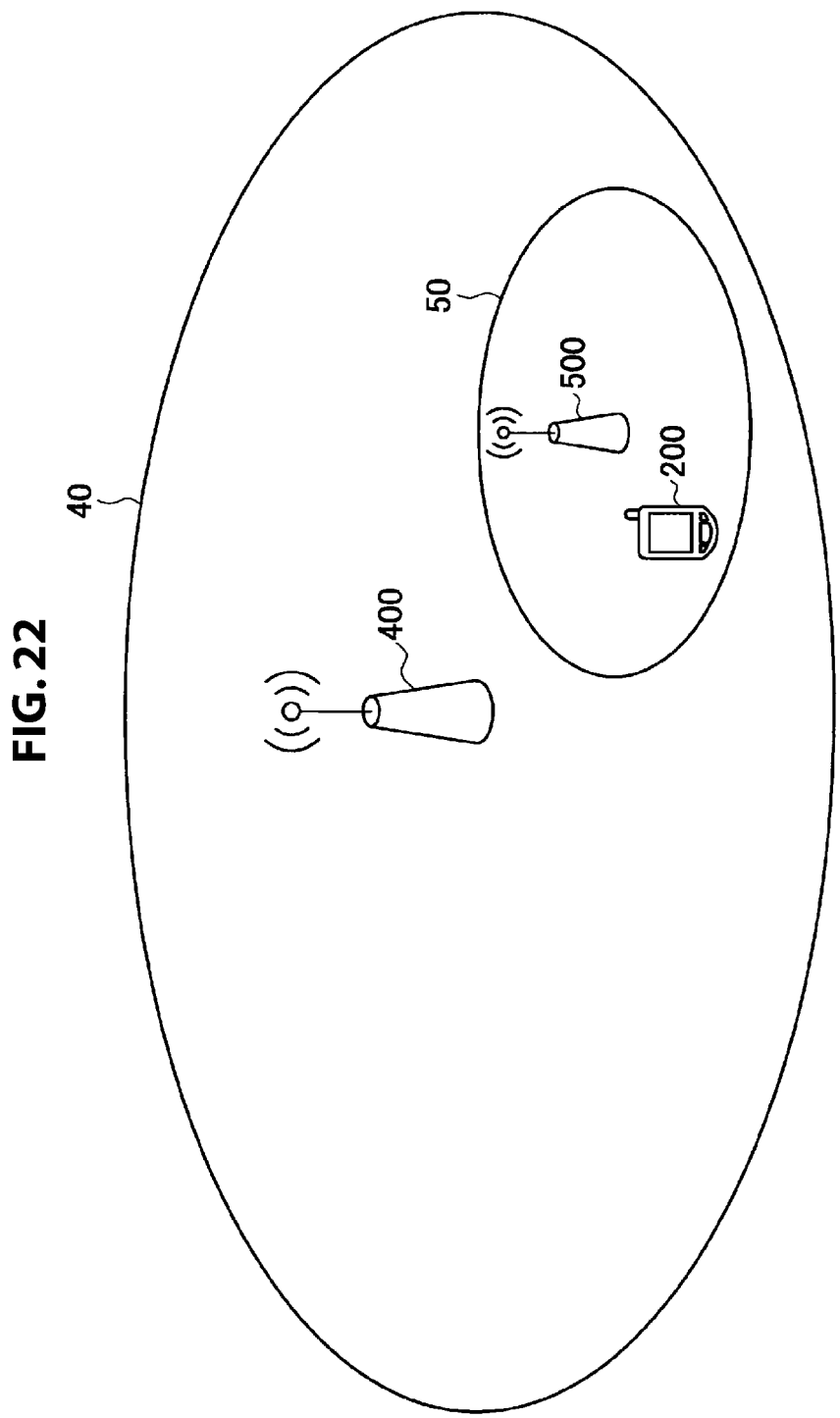
FIG. 22 is an explanatory diagram for describing an example of a base station according to a modified example of the embodiment.

FIG. 22 is an explanatory diagram for describing an example of a base station according to the modified example of the embodiment of the present disclosure. Referring to FIG. 22, a base station 400, a base station 500, and a terminal device 200 are illustrated. The base station 400 is a base station of a macro cell 40, and the base station 500 is a base station of a small cell 50. The terminal device 200 performs wireless communication with the base station 400 using the cellular band, and performs wireless communication with the base station 500 using the shared band. For example, the base station 500 performs the transmission of the downlink data to the terminal device 200 using the shared band, and the base station 400 performs the retransmission of the downlink data using the cellular band.

(Configurations of First Base Station and Second Base Station)

Each of the first base station and the second base station includes an antenna unit, a wireless communication unit, a network communication unit, a storage unit, and a processing unit, for example, similarly to the base station 100. Further, for example, the processing unit includes an information acquiring unit and a control unit, similarly to the processing unit 150.

(Technical Characteristics of Second Base Station)

(a) Transmission of Downlink Data

The second base station performs the transmission of the downlink data using the shared band. The control unit of the second base station controls the transmission of the downlink data in a manner that the transmission of the downlink data is performed using the shared band.

As an example, the control unit controls the transmission of the downlink data by allocating radio resources (for example, resource blocks) of the shared band to the terminal device 200 for the transmission of the downlink data. As a result, the second base station performs the transmission of the downlink data using the shared band.

(b) Retransmission of Downlink Data

For example, the first base station performs the retransmission of the downlink data using the cellular band. The control unit of the second base station controls the transmission of the downlink data in a manner that the transmission of the downlink data is performed using the cellular band.

As an example, the control unit controls the retransmission of the downlink data by requesting the first base station to perform the retransmission of the downlink data. In addition or alternatively, the control unit controls the retransmission of the downlink data by providing the downlink data or data generated based on the downlink data (for example, data generated by encoding the downlink data) to the first base station. As a result, the first base station performs the retransmission of the downlink data using the cellular band.

(c) Transmission of Downlink Control Information

For example, the control unit of the second base station controls the transmission of the DCI for the retransmission of the downlink data.

For example, the first base station transmits the DCI. In this case, as an example, the control unit controls the transmission of the DCI by providing information used for generation of the DCI (for example, the HARQ process number or the like) to another base station.

The second base station may transmit the DCI. In this case, the control unit controls the transmission of the DCI by performing generation of the DCI and/or the transmission process of the DCI (for example, mapping to radio resources or the like).

(Technical Characteristics of First Base Station)

(a) Retransmission of Downlink Data

For example, the first base station performs the retransmission of the downlink data using the cellular band. The control unit of the first base station controls the retransmission of the downlink data in a manner that the retransmission of the downlink data is performed using the cellular band.

As an example, the control unit controls the retransmission of the downlink data by allocating radio resources (for example, resource blocks) of the cellular band to the terminal device 200 for the transmission of the downlink data. As a result, the first base station performs the retransmission of the downlink data using the shared band. For example, the information acquiring unit of the first base station acquires the downlink data or data generated based on the downlink data (for example, data generated by encoding the downlink data).

(b) Transmission of Downlink Control Information

For example, the control unit of the first base station controls the transmission of the DCI for the retransmission of the downlink data.

For example, the first base station transmits the DCI. In this case, as an example, the control unit controls the transmission of the DCI by performing generation of the DCI and/or the transmission process of the DCI (for example, mapping to radio resources or the like).

<<7. Application Examples>>

Technology according to the present disclosure is applicable to various products. For example, the base station 100 (or the base station 400 or the base station 500) may be implemented as a type of eNB such as a macro eNB or a small eNB. The small eNB may be an eNB to cover a cell smaller than a macro cell such as a pico eNB, a micro eNB, or a home (femto) eNB. Conversely, the base station 100 (or the base station 400 or the base station 500) may also be realized as another type of base station, such as a Node B or a base transceiver station (BTS). The base station 100 (or the base station 400 or the base station 500) may also include a main unit that controls wireless communication (also called a base station device), and one or more remote radio heads (RRHs) placed in a location separate from the main unit. Also, various types of terminals to be described below temporarily or semi-permanently execute a base station function and therefore may operate as the base station 100 (or the base station 400 or the base station 500). Further, at least part of components of the base station 100 (or the base station 400 or the base station 500) may be implemented in a base station device or a module for the base station device.

In addition, the terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, at least a part of constituent elements of the terminal device 200 may be realized in a module mounted onboard these terminals (for example, an integrated circuit module configured on a single die).

<7.1. Application Examples Regarding Base Station>

(First Application Example)

Figure 23:
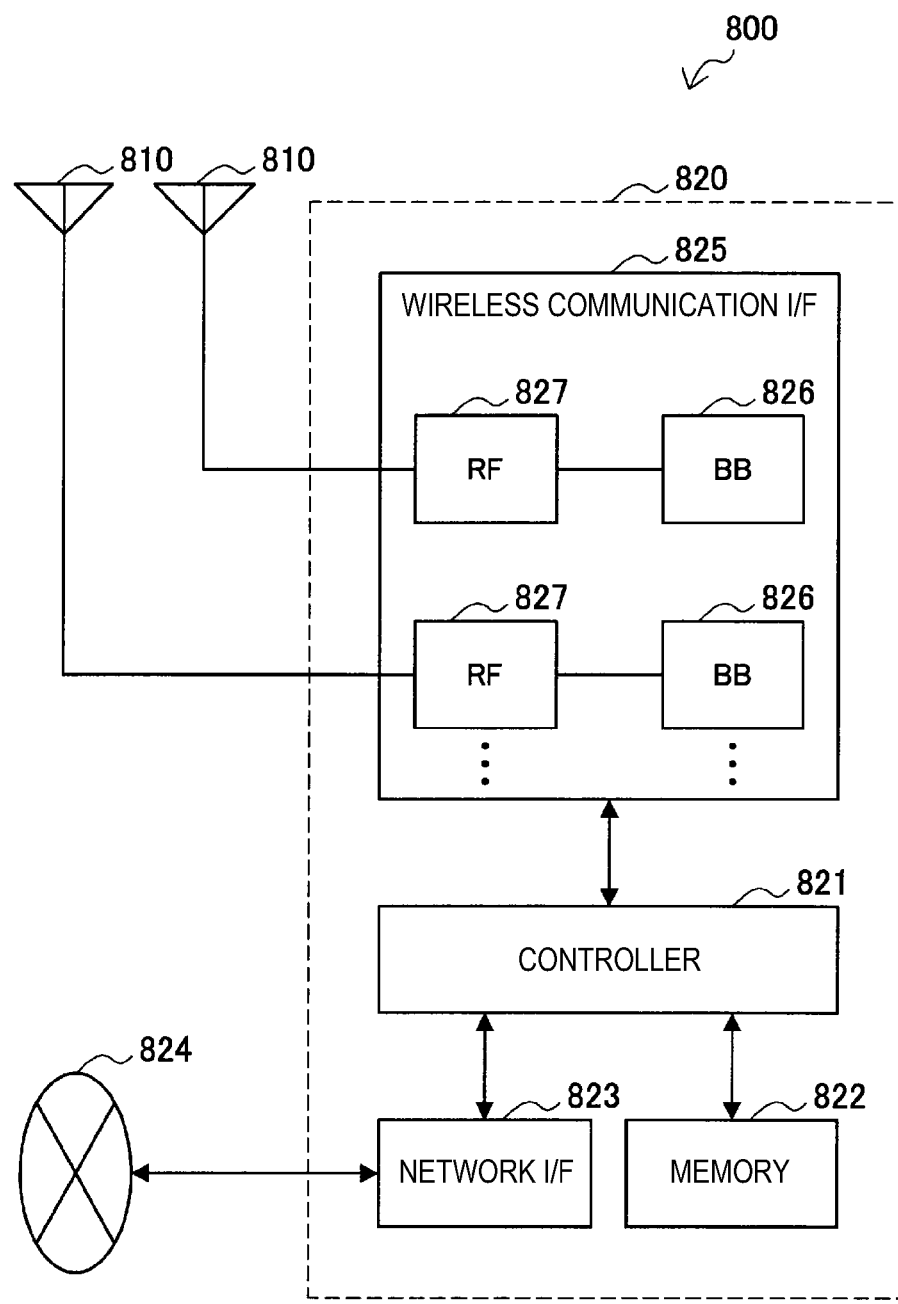
FIG. 23 is a block diagram illustrating a first example of a schematic configuration of an eNB.

FIG. 23 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 23. For example, the multiple antennas 810 may be compatible with multiple frequency bands used by the eNB 800. Although FIG. 23 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as LTE and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-mentioned logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 23. For example, the multiple BB processors 826 may be compatible with multiple frequency bands used by the eNB 800. The wireless communication interface 825 may include the multiple RF circuits 827, as illustrated in FIG. 23. For example, the multiple RF circuits 827 may be compatible with multiple antenna elements. Although FIG. 23 illustrates the example in which the wireless communication interface 825 includes the multiple BB processors 826 and the multiple RF circuits 827, the wireless communication interface 825 may also include a single BB processor 826 or a single RF circuit 827.

In the eNB 800 illustrated in FIG. 23, the control unit 153 (and the information acquiring unit 151) described with reference to FIG. 7 may be implemented in the wireless communication interface 825. Alternatively, at least a part of the control unit 153 (and the information acquiring unit 151) may be implemented in the controller 821. As one example, the eNB 800 is equipped with a module including a part (for example, the BB processor 826) or all of the wireless communication interface 825 and/or the controller 821, and the control unit 153 (and the information acquiring unit 151) may be implemented in the module. In this case, the above-mentioned module may store a program for causing the processor to function as the control unit 153 (and the information acquiring unit 151) (in other words, a program for causing the processor to execute the operation of the control unit 153 (and the information acquiring unit 151)) and execute the program. As another example, a program for causing the processor to function as the control unit 153 (and the information acquiring unit 151) is installed in the eNB 800, and the wireless communication interface 825 (for example, the BB processor 826) and/or the controller 821 may execute the program. As mentioned above, the eNB 800, the base station device 820, or the above-mentioned module may be provided as the device including the control unit 153 (and the information acquiring unit 151), and the program for causing the processor to function as the control unit 153 (and the information acquiring unit 151) may be provided. Also, a readable storage medium storing the above-mentioned program may be provided. With respect to these points, each of the control units (and the information acquiring units) of the base station 400 and the base station 500 described with reference to FIG. 22 are also similar to the control unit 153 (and the information acquiring unit 151).

Also, in the eNB 800 illustrated in FIG. 23, the wireless communication unit 120 described with reference to FIG. 7 may be implemented in the wireless communication interface 825 (for example, the RF circuit 827). Also, the antenna unit 110 may be implemented in the antenna 810. Also, the network communication unit 130 may be implemented in the controller 821 and/or the network interface 823. In these points, the antenna unit, the wireless communication unit, and the network communication unit of each of the base station 400 and the base station 500 described above with reference to FIG. 22 are similar to the antenna unit 110, the wireless communication unit 120, and the network communication unit 130.

(Second Application Example)

Figure 24:
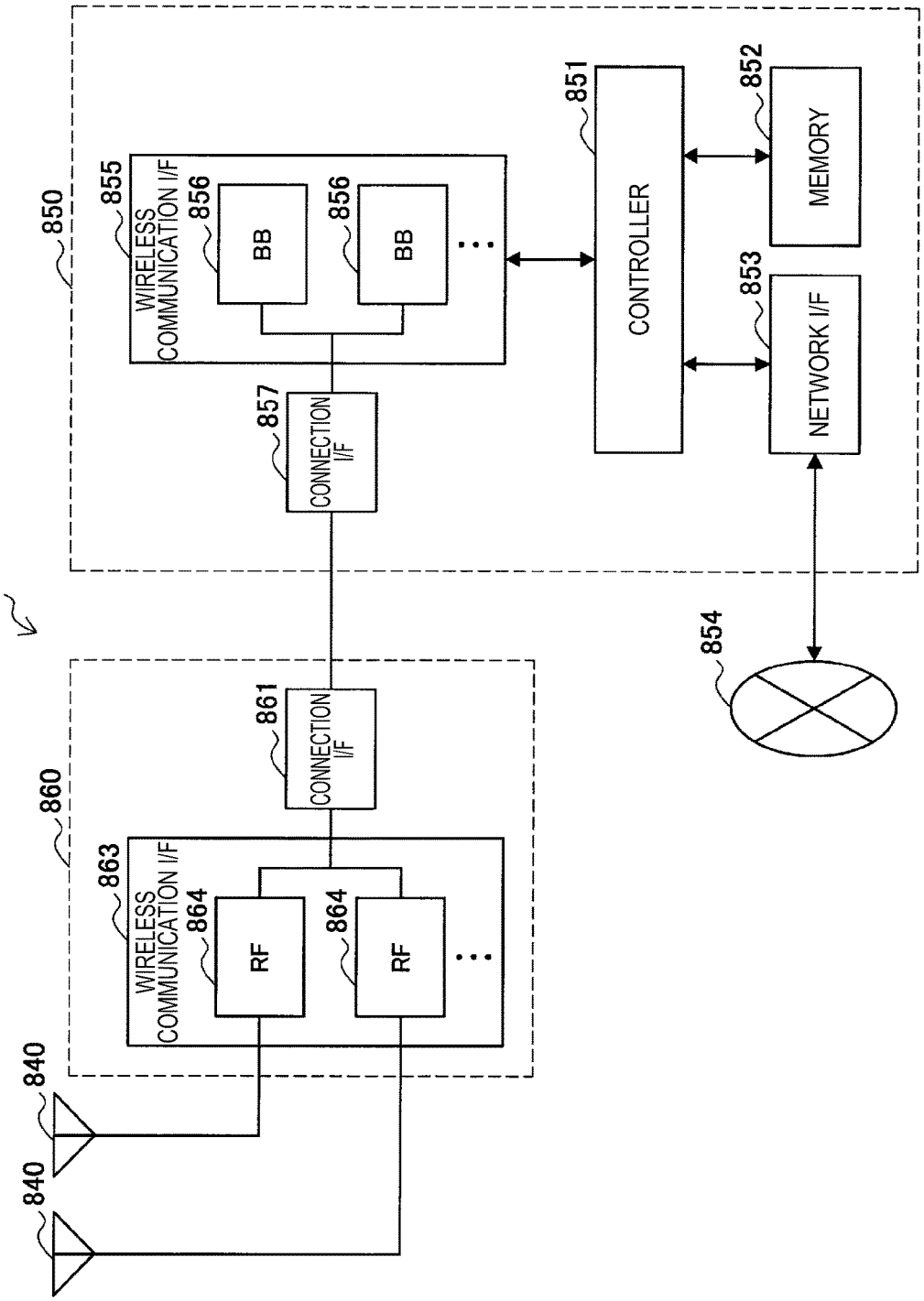
FIG. 24 is a block diagram illustrating a second example of a schematic configuration of an eNB.

FIG. 24 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 24. For example, the multiple antennas 840 may be compatible with multiple frequency bands used by the eNB 830. Although FIG. 24 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 23.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 23, except the BB processor 856 is connected to the RF circuit 864 of the RRH 860 via the connection interface 857. The wireless communication interface 855 may include the multiple BB processors 856, as illustrated in FIG. 24. For example, the multiple BB processors 856 may be compatible with multiple frequency bands used by the eNB 830. Although FIG. 24 illustrates the example in which the wireless communication interface 855 includes the multiple BB processors 856, the wireless communication interface 855 may also include a single BB processor 856.

Furthermore, in addition to a cellular communication scheme, the wireless communication interface 855 may support a radio LAN communication scheme. In that case, the wireless communication interface 825 may include the BB processor 856 in the radio LAN communication scheme.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-mentioned high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 24. For example, the multiple RF circuits 864 may support multiple antenna elements. Although FIG. 24 illustrates the example in which the wireless communication interface 863 includes the multiple RF circuits 864, the wireless communication interface 863 may also include a single RF circuit 864.

In the eNB 830 illustrated in FIG. 24, the control unit 153 (and the information acquiring unit 151) described with reference to FIG. 7 may be implemented in the wireless communication interface 855 and/or the wireless communication interface 863. Alternatively, at least a part of the control unit 153 (and the information acquiring unit 151) may be implemented in the controller 851. As one example, the eNB 830 is equipped with a module including a part (for example, the BB processor 856) or all of the wireless communication interface 855 and/or the controller 851, and the control unit 153 (and the information acquiring unit 151) may be implemented in the module. In this case, the above-mentioned module may store a program for causing the processor to function as the control unit 153 (and the information acquiring unit 151) (in other words, a program for causing the processor to execute the operation of the control unit 153 (and the information acquiring unit 151)) and execute the program. As another example, a program for causing the processor to function as the control unit 153 (and the information acquiring unit 151) is installed in the eNB 830, and the wireless communication interface 855 (for example, the BB processor 856) and/or the controller 851 may execute the program. As mentioned above, the eNB 830, the base station device 850, or the above-mentioned module may be provided as the device including the control unit 153 (and the information acquiring unit 151), and the program for causing the processor to function as the control unit 153 (and the information acquiring unit 151) may be provided. Also, a readable storage medium storing the above-mentioned program may be provided. With respect to these points, each of the control units (and the information acquiring units) of the base station 400 and the base station 500 described with reference to FIG. 22 are also similar to the control unit 153 (and the information acquiring unit 151).

Figure 7:
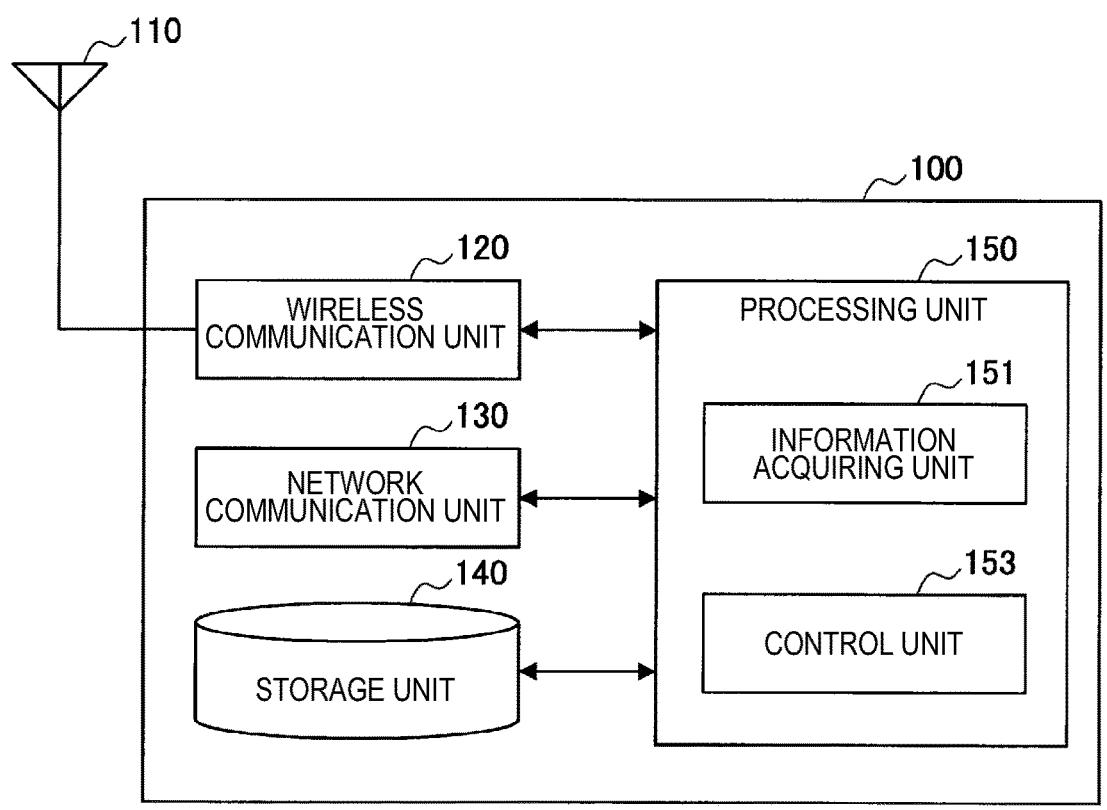
FIG. 7 is a block diagram illustrating an example of a configuration of a base station according to the embodiment.

Also, in the eNB 830 illustrated in FIG. 24, the wireless communication unit 120 described, for example, with reference to FIG. 7 may be implemented in the wireless communication interface 863 (for example, the RF circuit 864). Also, the antenna unit 110 may be implemented in the antenna 840. Also, the network communication unit 130 may be implemented in the controller 851 and/or the network interface 853. In these points, the antenna unit, the wireless communication unit, and the network communication unit of each of the base station 400 and the base station 500 described above with reference to FIG. 22 are similar to the antenna unit 110, the wireless communication unit 120, and the network communication unit 130.

<7.2. Application Examples Regarding Terminal Device>
(First Application Example)

Figure 25:
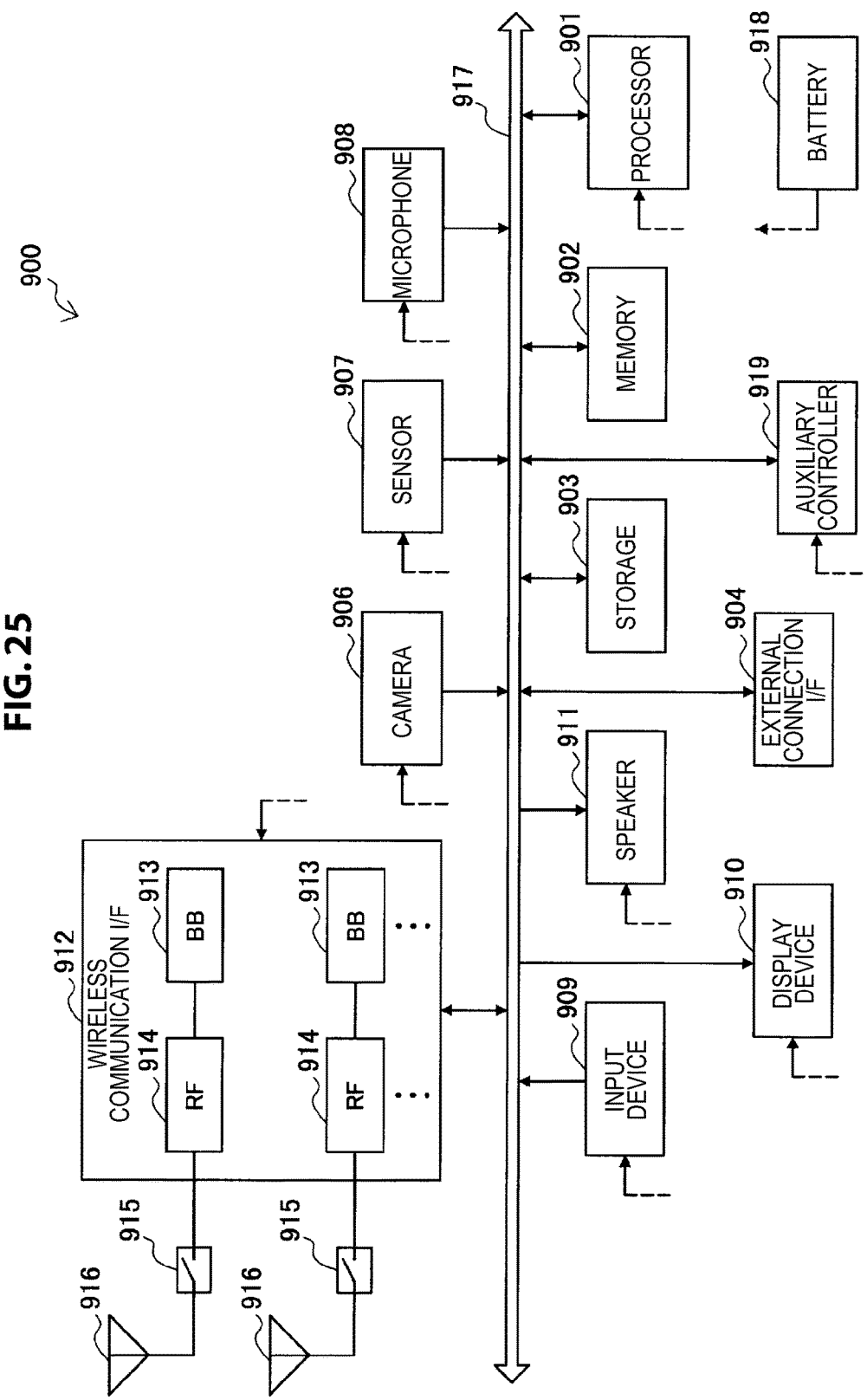
FIG. 25 is a block diagram illustrating an example of a schematic configuration of a smartphone.

FIG. 25 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals.

The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 934 and the multiple RF circuits 914, as illustrated in FIG. 25. Although FIG. 25 illustrates the example in which the wireless communication interface 912 includes the multiple BB processors 913 and the multiple RF circuits 914, the wireless communication interface 912 may also include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 25. Although FIG. 25 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 25 via feeder lines, which are partially shown as dashed lines in the figure. The auxiliary controller 919 operates a minimum necessary function of the smartphone 900, for example, in a sleep mode.

In the smartphone 900 illustrated in FIG. 25, the control unit 243 (and the information acquiring unit 241) described with reference to FIG. 8 may be implemented in the wireless communication interface 912. Alternatively, at least a part of the control unit 243 (and the information acquiring unit 241) may be implemented in the processor 901 or the auxiliary controller 919. As one example, the smartphone 900 is equipped with a module including a part (for example, the BB processor 913) or all of the wireless communication interface 912, the processor 901 and/or the auxiliary controller 919, and the control unit 243 (and the information acquiring unit 241) may be implemented in the module. In this case, the above-mentioned module may store a program for causing the processor to function as the control unit 243 (and the information acquiring unit 241) (in other words, a program for causing the processor to execute the operation of the control unit 243 (and the information acquiring unit 241)) and execute the program. As another example, a program for causing the processor to function as the control unit 243 (and the information acquiring unit 241) is installed in the smartphone 900, and the wireless communication interface 912 (for example, the BB processor 913), the processor 901, and/or the auxiliary controller 919 may execute the program. As mentioned above, the smartphone 900 or the above-mentioned module may be provided as the device including the control unit 243 (and the information acquiring unit 241), and the program for causing the processor to function as the control unit 243 (and the information acquiring unit 241) may be provided. Also, a readable storage medium storing the above-mentioned program may be provided.

Figure 8:
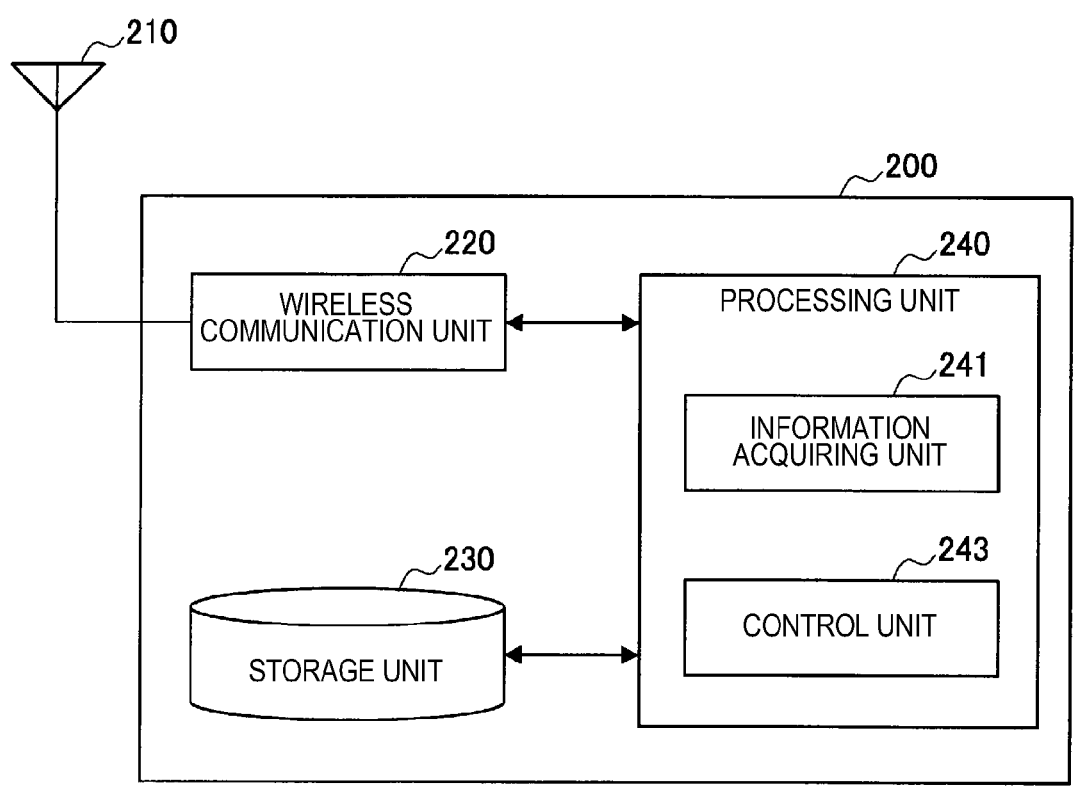
FIG. 8 is a block diagram illustrating an example of a configuration of a terminal device according to the embodiment.

Also, in the smartphone 900 illustrated in FIG. 25, the wireless communication unit 220 described, for example, with reference to FIG. 8 may be implemented in the wireless communication interface 912 (for example, the RF circuit 914). Also, the antenna unit 210 may be implemented in the antenna 916.

(Second Application Example)

Figure 26:
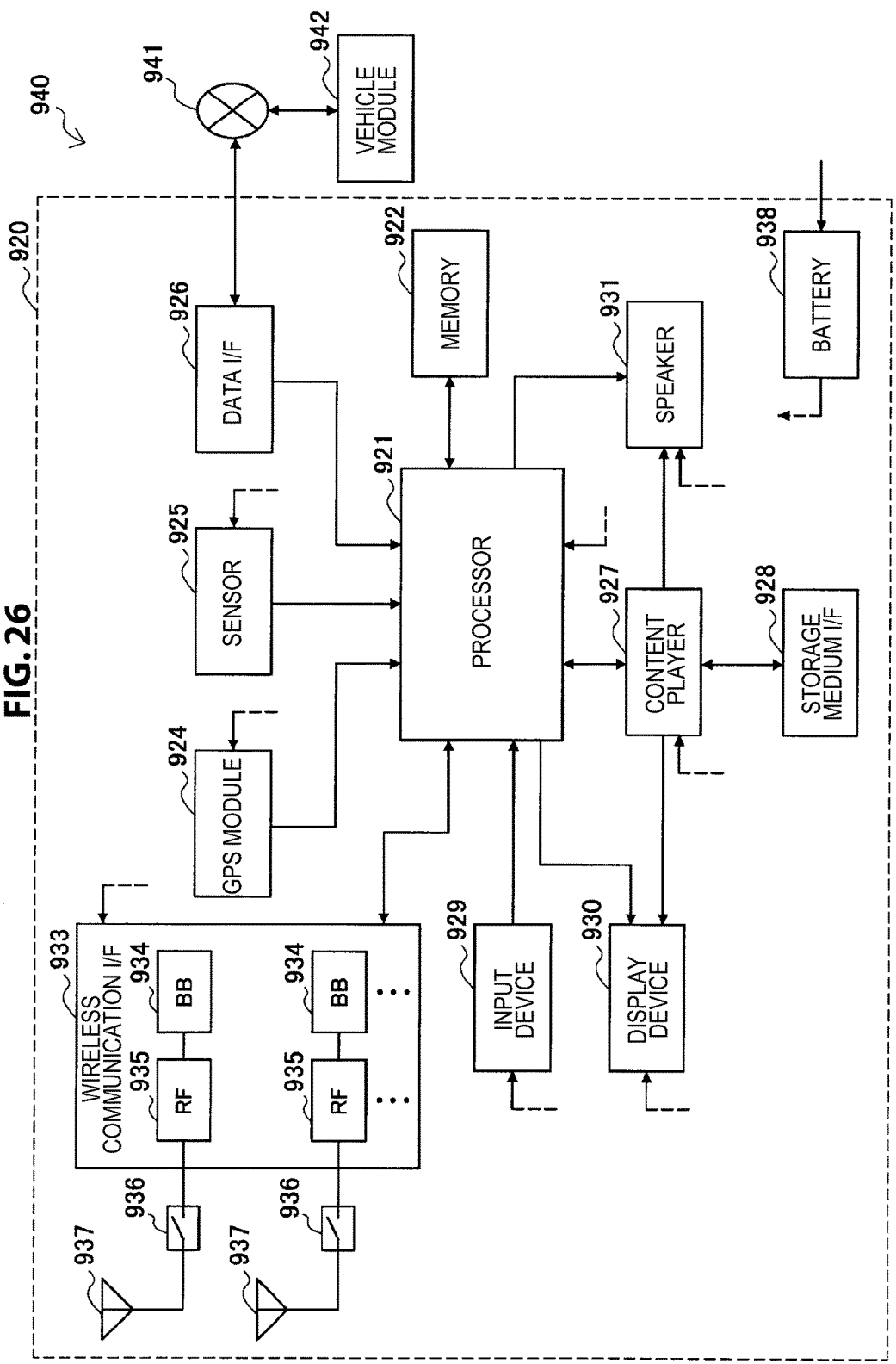
FIG. 26 is a block diagram illustrating an example of a schematic configuration of a car navigation device.

FIG. 26 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 26. Although FIG. 26 illustrates the example in which the wireless communication interface 933 includes the multiple BB processors 934 and the multiple RF circuits 935, the wireless communication interface 933 may also include a single BB processor 934 or a single RF circuit 935.

Further, the wireless communication interface 933 may support other types of wireless communication system such as a short range wireless communication system, a near field communication system, and a wireless local area network (LAN) system in addition to the cellular communication system, and in this case, the wireless communication interface 912 may include the BB processor 934 and the RF circuit 935 for each wireless communication system.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 26. Although FIG. 26 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 26 via feeder lines that are partially shown as dashed lines in the figure. The battery 938 accumulates power supplied form the vehicle.

In the car navigation device 920 illustrated in FIG. 26, the control unit 243 (and the information acquiring unit 241) described with reference to FIG. 8 may be implemented in the wireless communication interface 933. Alternatively, at least a part of the control unit 243 (and the information acquiring unit 241) may be implemented in the processor 921. As one example, the car navigation device 920 is equipped with a module including a part (for example, the BB processor 934) or all of the wireless communication interface 933, and/or processor 921, and the control unit 243

(and the information acquiring unit 241) may be implemented in the module. In this case, the above-mentioned module may store a program for causing the processor to function as the control unit 243 (and the information acquiring unit 241) (in other words, a program for causing the processor to execute the operation of the control unit 243 (and the information acquiring unit 241)) and execute the program. As another example, a program for causing the processor to function as the control unit 243 (and the information acquiring unit 241) is installed in the car navigation device 920, and the wireless communication interface 933 (for example, the BB processor 934), and/or the processor 921 may execute the program. As mentioned above, the car navigation device 920 or the above-mentioned module may be provided as the device including the control unit 243 (and the information acquiring unit 241), and the program for causing the processor to function as the control unit 243 (and the information acquiring unit 241) may be provided. Also, a readable storage medium storing the above-mentioned program may be provided.

Also, in the car navigation device 920 illustrated in FIG. 26, the wireless communication unit 220 described, for example, with reference to FIG. 8 may be implemented in the wireless communication interface 933 (for example, the RF circuit 935). Also, the antenna unit 210 may be implemented in the antenna 937.

The technology of the present disclosure may also be realized as an in-vehicle system (or a vehicle) 940 including one or more blocks of the car navigation device 920, the in-vehicle network 941, and a vehicle module 942. That is, the in-vehicle system (or the vehicle) 940 may be provided as a device including the control unit 243 (and the information acquiring unit 241). The vehicle module 942 generates vehicle data such as vehicle speed, engine speed, and trouble information, and outputs the generated data to the in-vehicle network 941.

<<8. Conclusion>>

The communication devices and the processes according to the embodiments of the present disclosure have been described with reference to FIGS. 6 to 26.

According to the embodiment of the present disclosure, the base station 100 includes the control unit 153 that controls the transmission of the downlink data in a manner that the transmission of the downlink data is performed using the shared band (that is, the frequency band shared by a plurality of wireless communication systems including the cellular system). The control unit 153 controls the retransmission of the downlink data in a manner that the retransmission of the downlink data is performed using the cellular band (that is, the frequency band for the cellular system).

Further, according to the embodiment of the present disclosure, the terminal device 200 includes the control unit 243 that performs the receiving side process in the retransmission control process according to the transmission of the downlink data performed by the base station using the shared band (that is, the frequency band shared by a plurality of wireless communication systems including the cellular system). The control unit 243 performs the receiving side process in the retransmission control process according to the retransmission of the downlink data performed by the base station using the cellular band (that is, the frequency band for the cellular system).

Accordingly, for example, when the shared band (that is, the frequency band shared by a plurality of wireless communication systems) is used in the cellular system, it is possible to retransmit the downlink data with a high degree of certainty.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Although an example in which the cellular system is a system conforming to LTE, LTE-Advanced, or a compliant communication scheme has been described, the present disclosure is not limited to such an example. For example, the cellular system may be the one conforming to another communication standard.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Further, it is also possible to create a computer program for making a processor (such as, for example, a CPU and a DSP) provided at apparatuses (such as, for example, the base station, the base station device or the module of the base station device, or the terminal device or the module for the terminal device) in the present specification function as components of the above-described apparatuses (for example, the control unit) (in other words, a computer program for making the processor execute operation of the components of the above-described apparatuses). Further, it is also possible to provide a recording medium having the above-described computer program recorded therein. Further, it is also possible to provide an apparatus (such as, for example, a base station, a base station device, and a module for the base station device, or a terminal device and a module for a terminal device) including a memory having the above-described computer program stored therein and one or more processors which can execute the above-described computer program. Further, a method including the operation of the components (for example, the control unit) of the above-described apparatuses is included in the technique according to the present disclosure.

In addition, the advantageous effects described in this specification are merely for the sake of explanation or illustration, and are not limiting. In other words, instead of or in addition to the above advantageous effects, technology according to the present disclosure may exhibit other advantageous effects that are clear to persons skilled in the art from the description of this specification.

Additionally, the present technology may also be configured as below.

(1)

A device, including:

a control unit configured to control transmission of downlink data in a manner that the transmission of the downlink data is performed using a first frequency band shared by a plurality of wireless communication systems including a cellular system, wherein the control unit controls retransmission of the downlink data in a manner that the retransmission of the downlink data is performed using a second frequency band for the cellular system.

(2)
The device according to (1),
wherein the control unit controls transmission of downlink control information for the retransmission of the downlink data, and
the downlink control information indicates the first frequency band as a shared frequency band used for the transmission of the downlink data.
(3)
The device according to (2),
wherein the downlink control information is information according to a predetermined format, and
the predetermined format includes a field indicating the shared frequency band used for the transmission of the downlink data.
(4)
The device according to (3),
wherein the control unit notifies a terminal device of two or more bit pattern candidates included in the field and shared frequency bands corresponding to the two or more bit patterns.
(5)
The device according to (3) or (4),
wherein the predetermined format includes a field indicating a retransmission control process for the downlink data.
(6)
The device according to (5),
wherein the retransmission control process is a hybrid automatic repeat request (HARQ) process, and
the field indicating the retransmission control process is a HARQ process number field.
(7)
The device according to any one of (3) to (6),
wherein the predetermined format does not include a field indicating whether resource allocation is for transmission of new data or for retransmission.
(8)
The device according to any one of (1) to (7),
wherein the control unit controls the retransmission of the downlink data in a manner that the retransmission of the downlink data is performed using the second frequency band within a limited period.
(9)
The device according to (8),
wherein the limited period is a period corresponding to an end time of use of the second frequency band.
(10)
The device according to (9),
wherein the limited period is a period that starts at a predetermined time before the end time.
(11)
The device according to (9),
wherein the limited period is a period that starts from the end time.
(12)
The device according to any one of (1) to (11),
wherein the downlink data is downlink data that is transmitted to a terminal device that supports carrier aggregation,
the first frequency band is a secondary component carrier for the terminal device, and
the second frequency band is a primary component carrier or a secondary component carrier for the terminal device.
(13)
The device according to any one of (1) to (12),
wherein the first frequency band is a channel of a wireless local area network (LAN).
(14)
A method, including:
controlling, by a processor, transmission of downlink data in a manner that the transmission of the downlink data is performed using a first frequency band shared by a plurality of wireless communication systems including a cellular system; and
controlling, by the processor, retransmission of the downlink data in a manner that the retransmission of the downlink data is performed using a second frequency band for the cellular system.
(15)
A device, including:
a control unit configured to perform a receiving side process in a retransmission control process according to transmission of downlink data performed by a base station using a first frequency band shared by a plurality of wireless communication systems including a cellular system,
wherein the control unit performs the receiving side process in the retransmission control process according to retransmission of the downlink data performed by the base station using a second frequency band for the cellular system.
(16)
The device according to (15),
wherein the retransmission control process is a hybrid automatic repeat request (HARQ) process.
(17)
The device according to (15) or (16),
wherein the control unit specifies the retransmission control process based on downlink control information for the retransmission of the downlink data, and
the downlink control information indicates the first frequency band as a shared frequency band used for the transmission of the downlink data, and indicates the retransmission control process as a retransmission control process for the downlink data.
(18)
The device according to (17),
wherein the downlink control information is information according to a predetermined format, and
the predetermined format includes a field indicating the shared frequency band used for the transmission of the downlink data and a field indicating the retransmission control process for the downlink data.
(19)
The device according to (18),
wherein the predetermined format does not include a field indicating whether resource allocation is for transmission of new data or for retransmission, and
the control unit determines that the resource allocation of the downlink control information is for the retransmission based on the fact that the downlink control information is the information according to the predetermined format.
(20)
A method, including:
performing, by a processor, a receiving side process in a retransmission control process according to transmission of downlink data performed by a base station using a first frequency band shared by a plurality of wireless communication systems including a cellular system; and
performing, by the processor, the receiving side process in the retransmission control process according to retransmission of the downlink data performed by the base station using a second frequency band for the cellular system.

(21)

A program for causing a processor to:
control transmission of downlink data in a manner that the transmission of the downlink data is performed using a first frequency band shared by a plurality of wireless communication systems including a cellular system; and
control retransmission of the downlink data in a manner that the retransmission of the downlink data is performed using a second frequency band for the cellular system.

(22)

A readable recording medium having a program recorded thereon, the program causing a processor to:
control transmission of downlink data in a manner that the transmission of the downlink data is performed using a first frequency band shared by a plurality of wireless communication systems including a cellular system; and
control retransmission of the downlink data in a manner that the retransmission of the downlink data is performed using a second frequency band for the cellular system.

(23)

A program for causing a processor to:
perform a receiving side process in a retransmission control process according to transmission of downlink data performed by a base station using a first frequency band shared by a plurality of wireless communication systems including a cellular system; and
perform the receiving side process in the retransmission control process according to retransmission of the downlink data performed by the base station using a second frequency band for the cellular system.

(24)

A readable recording medium having a program recorded thereon, the program causing a processor to:
perform a receiving side process in a retransmission control process according to transmission of downlink data performed by a base station using a first frequency band shared by a plurality of wireless communication systems including a cellular system; and
perform the receiving side process in the retransmission control process according to retransmission of the downlink data performed by the base station using a second frequency band for the cellular system.

REFERENCE SIGNS LIST 1 system
10 cell
40 macro cell
50 small cell
100 base station
153 control unit
200 terminal device
243 control unit
400 base station
500 base station

The invention claimed is:

1. A device, comprising:
at least one processor configured to:
control transmission of downlink data based on a first allocation of a first frequency band,
wherein the transmission of the downlink data is within a first time period, and
wherein the first frequency band is a shared band shared by a plurality of wireless communication systems including a cellular system;
determine an acknowledgement related to reception of the downlink data is received; and
control retransmission of the downlink data based on a second allocation of a second frequency band, and a determination of a lack of reception of the acknowledgement,
wherein the retransmission of the downlink data occurs within a second time period,
wherein a start time of the second time period starts before an end time of the first time period and the retransmission of the downlink data on the second frequency band is executed before release of the first frequency band, and
wherein the second frequency band is a licensed band for the cellular system.

2. The device according to claim 1, wherein the at least one processor is further configured to:
control transmission of downlink control information, indicating that the transmission of the downlink data, to a terminal device based on the first allocation of the first frequency band.

3. The device according to claim 2,
wherein the downlink control information is information based on a format, and
wherein the format includes a first field that indicates the shared band used for the transmission of the downlink data.

4. The device according to claim 3, wherein the at least one processor is further configured to notify the terminal device of at least two bit pattern candidates corresponding to the shared band included in the first field and shared frequency bands corresponding to the at least two bit patterns.

5. The device according to claim 3, wherein the format includes a second field that indicates a retransmission control process for the downlink data.

6. The device according to claim 5,
wherein the retransmission control process is a hybrid automatic repeat request (HARQ) process, and
wherein the second field is a HARQ process number field.

7. The device according to claim 3, wherein the format excludes a field that indicates whether resource allocation is for one of transmission of new data or for retransmission.

8. The device according to claim 1,
wherein the downlink data is transmitted to a terminal device that supports carrier aggregation,
wherein the first frequency band is a secondary component carrier for the terminal device, and
wherein the second frequency band is one of a primary component carrier or a secondary component carrier for the terminal device.

9. The device according to claim 1, wherein the first frequency band is a channel of a wireless local area network (LAN).

10. A method, comprising:
controlling, by at least one processor, transmission of downlink data based on a first allocation of a first frequency band,
wherein the transmission of the downlink data is within a first time period, and
wherein the first frequency band is a shared band shared by a plurality of wireless communication systems including a cellular system;
determining an acknowledgement related to reception of the downlink data is received; and
controlling, by the at least one processor, retransmission of the downlink data based on a second allocation of a second frequency band, and the determination of a lack of reception of the acknowledgement, wherein the retransmission of the downlink data occurs within a second time period, wherein a start time of the second time period starts before an end time of the first time period and the retransmission of the downlink data on the second frequency band is executed before release of the first frequency band, and wherein the second frequency band is a licensed band for the cellular system.

11. A device, comprising:

at least one processor configured to:

control a first reception process based on transmission of downlink data by a base station, wherein the transmission of the downlink data is based on a first allocation of a first frequency band, wherein the transmission of the downlink data is within a first time period, and wherein the first frequency band is a shared band shared by a plurality of wireless communication systems including a cellular system;

determine an acknowledgement of the reception of the downlink data is transmitted to the base station; and control a second reception process based on retransmission of the downlink data by the base station, wherein the retransmission of the downlink data is based on a second allocation of a second frequency band, and a determination of a lack of the transmission of the acknowledgement, wherein the retransmission of the downlink data occurs within a second time period, wherein a start time of the second time period starts before an end time of the first time period and the retransmission of the downlink data on the second frequency band is executed before release of the first frequency band, and wherein the second frequency band is a licensed band for the cellular system.

12. The device according to claim 11, wherein the retransmission control process is a hybrid automatic repeat request (HARQ) process.

13. The device according to claim 11, wherein the at least one processor is further configured to receive downlink control information transmitted by the base station, wherein the received downlink control information indicates the transmission of the downlink data is based on the first allocation of the first frequency band.

14. The device according to claim 13, wherein the downlink control information is information based on a format, and wherein the format includes a first field that indicates the shared band used for the transmission of the downlink data and a second field that indicates the retransmission of the downlink data.

15. The device according to claim 14, wherein the format excludes a field that indicates whether resource allocation is for one of transmission of new data or for the retransmission, and the at least one processor is further configured to determine that the resource allocation of the downlink control information is for the retransmission based the downlink control information.

16. A method, comprising:

controlling, by at least one processor, a first reception process based on transmission of downlink data by a base station, wherein the transmission of the downlink data is based on a first allocation of a first frequency band, wherein the transmission of the downlink data is within a first time period, and wherein the first frequency band is a shared band shared by a plurality of wireless communication systems including a cellular system;

determining, by the at least one processor, an acknowledgement of the reception of the downlink data is transmitted to the base station; and controlling, by the at least one processor, a second reception process based on retransmission of the downlink data by the base station, wherein the retransmission of the downlink data is based on a second allocation of a second frequency band, and the determination of a lack of the transmission of the acknowledgement, wherein the retransmission of the downlink data occurs within a second time period, wherein a start time of the second time period starts before an end time of the first time period and the retransmission of the downlink data on the second frequency band is executed before release of the first frequency band, and wherein the second frequency band is a licensed band for the cellular system.

* * * * *